United States Patent [11] 3,629,518

[72] Inventor Michael J. Costa
41 Green Place, New Rochelle, N.Y. 10801

[21] Appl. No. 871,533
[22] Filed Nov. 10, 1969
[45] Patented Dec. 21, 1971
Continuation of application Ser. No. 503,122, Oct. 23, 1965, now abandoned. This application Nov. 10, 1969, Ser. No. 871,533

[54] ROTATING FIELD TRANSFORMER AND TAPE RECORDING SYSTEM USING SAME
17 Claims, 48 Drawing Figs.

[52] U.S. Cl. 179/100.2 T, 178/6.6 A, 179/100.2 CB, 179/100.2 CF, 191/2, 323/112, 346/74 MC
[51] Int. Cl. G01d 15/12, G11b 5/20, H04r 1/24
[50] Field of Search 179/100.2 CB, 100.2 CF, 100.2 MD, 100.2 T; 310/13; 318/121, 135, 660; 346/74 MC

[56] References Cited

UNITED STATES PATENTS 2,428,570 10/1947 Jones 310/13
2,743,320 4/1956 Daniels et al. 179/100.2
2,831,131 4/1958 Klotz 310/13
2,955,169 10/1960 Stedtnitz 179/100.2
3,152,225 10/1964 Peters 179/100.2
3,175,049 3/1965 Gabor 179/100.2
3,273,727 9/1966 Rogers et al. 214/16
3,382,325 5/1968 Camras 179/100.2

*Primary Examiner*—Bernard Konick
*Assistant Examiner*—J. Russell Goudeau
*Attorney*—Hopgood and Calimafde ABSTRACT: A magnetic recording and reproducing head which produces an incremental magnetic field perpendicular to the plane of the record medium. The field is caused to travel along a path which is transverse to the length of a relatively slow moving tape thus producing high-relative speed between tape and field.

The recording field is generated by applying opposing sawtooth signals to a pair of orthogonally related stator coils on the head and is modulated by changing the relative phase of the sawtooth signals. The signals are applied to the head through transformers having main and auxiliary primary coils, the sawtooth signals being applied to the main primary coils and modulating signals being applied to the auxiliary coils.

INVENTOR.
MICHAEL J. COSTA
BY
Hopgood and Calimafde

INVENTOR.
MICHAEL J. COSTA
BY
Hopgood and Calimafde

INVENTOR.
MICHAEL J. COSTA
BY Hopgood and Calimafde

INVENTOR.
MICHAEL J. COSTA
BY Hopgood and Calimafde

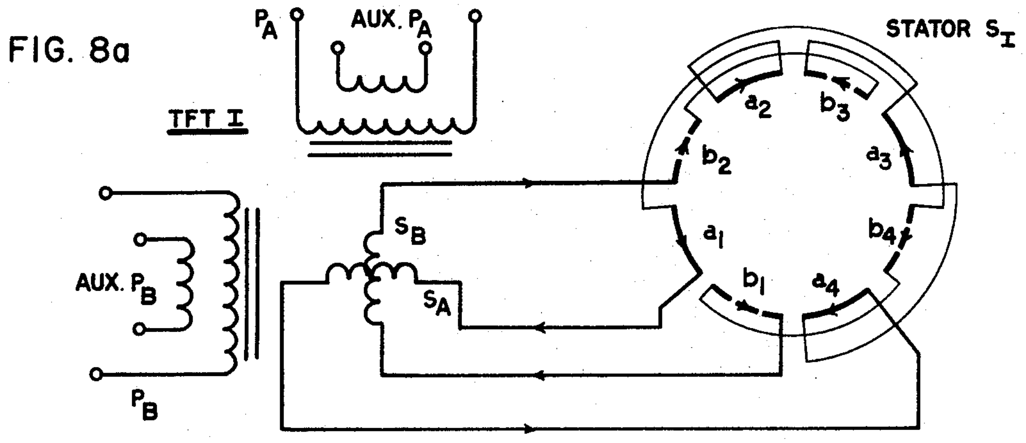
FIG. 8b
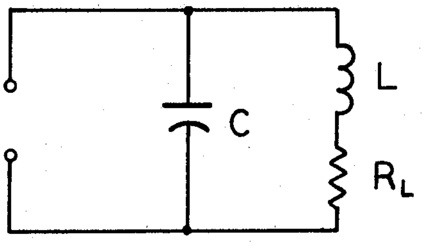
FIG. 8c
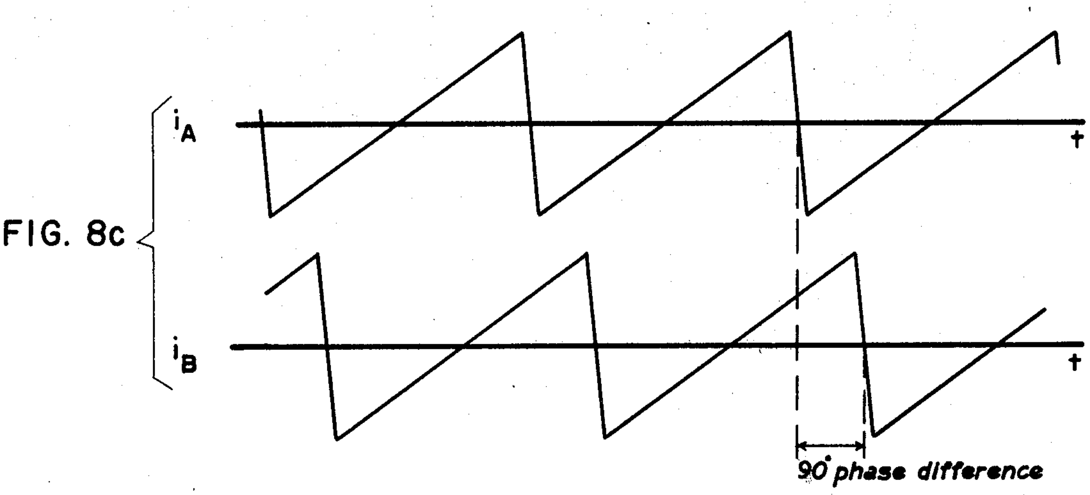
FIG. 8d
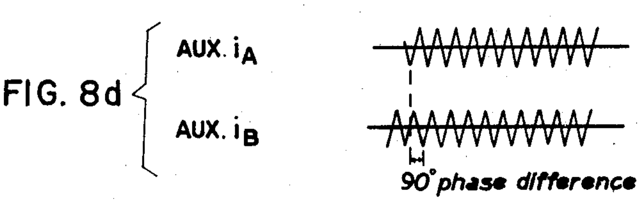
INVENTOR.
MICHAEL J. COSTA
BY [signature]

INVENTOR.
MICHAEL J. COSTA

INVENTOR.
MICHAEL J. COSTA

INVENTOR.
MICHAEL J. COSTA

INVENTOR.
MICHAEL J. COSTA

INVENTOR.
MICHAEL J. COSTA

INVENTOR.
MICHAEL J. COSTA

INVENTOR.
MICHAEL J. COSTA
BY [signature]

INVENTOR.
MICHAEL J. COSTA

INVENTOR.
MICHAEL J. COSTA
BY
Dodge and Calmeffle

ROTATING FIELD TRANSFORMER AND TAPE RECORDING SYSTEM USING SAME

CROSS REFERENCE TO RELATED APPLICATION

This application is a continuation of my prior application Ser. No. 503,122 filed Oct. 23, 1965, now abandoned.

This invention relates to a traveling field transformer, and more particularly relates to a transformer which produces a traveling or rotating magnetic field but does not have any moving parts. In an important aspect of this invention, the traveling field transformer is utilized as a basic component in producing a magnetic tape recording system.

The traveling field transformer described herein has general applicability. It differs from other conventional devices, such as motors and generators which have utilized the rotating field principle, inasmuch as my invention is essentially a static device. The advantages of the traveling field transformer will be explained with particular applicability to my tape recording system.

My novel tape recorder is primarily directed toward television recording which, in view of the wide frequency bandwidth associated with a conventional video signal, presents a difficult signal to record. In any system which must record a wide bandwidth of frequencies, extending into the megacycle range, a high-relative speed must be maintained between the tape (medium) and the magnetizing field (recording head) acting on the medium. If this required high speed is obtained by the conventional audio-recording technique of pulling a narrow tape past a stationary recording head, a large quantity of tape is required because of the high-tape velocity. Alternatively, the recording and medium transport velocities can be separated by using a relatively wide tape and recording across its width in a series of closely spaced tracks. By separating the recording and transport velocities in this way the medium is no longer consumed at a rate directly proportional to the relative head to tape velocity, which the bandwidth requirements necessitate be high. However, in their present mechanical form recording systems with transverse scan are complex.

In television tape recorders, a single longitudinal signal track is undesirable because of the enormous amount of tape required for any television show. It is estimated that for an ordinary half-hour television show 54,000 feet of magnetic tape are required using the slowest tape speed practicable. Other prior art attempts to facilitate television tape recordings, as illustrated in the Ginsburg et al. U.S. Pat. Nos. 2,921,990 and 2,956,114, have utilized transverse tape scanning. In these systems the tape is pulled in a longitudinal direction while a recording head is mechanically moved transversely across the width of the tape to impress the signal on the magnetic medium. Because of the nature of the compound movement, the signal track is essentially slanted with respect to the longitudinal axis. In order to achieve continuity of recorded signal between adjacent transverse tracks, a plurality of heads are rotated, each of which consequently forms a slanted signal track in which redundant signals are recorded at the termination of one track and the initiation of the next. The mechanical operation of rotating plural magnetic heads has obvious disadvantages. The expense, size, weight, and precision requirements place substantial practical limitations on the effectiveness of the system as well as its widespread adoption.

Accordingly, an object of my invention is to provide a magnetic tape-recording system incorporating transverse tape scanning, but using static means to provide the transverse movement of the recording magnetic field.

A second object of my invention is to define the narrow region of m.m.f. which magnetizes the medium, nonmechanically.

An additional object is to provide a recording system in which there is no inherent mechanical contact between the tape and recording head, thus reducing tape and head wear to a minimum.

A further object of this invention is to provide a simplified magnetic recording system in which the important system parameters are determined by electrical constants rather than mechanical ones. In particular the width of the magnetizing m.m.f. in the direction of m.m.f. motion and the velocity of that m.m.f. across the tape width are directly determined by electrical constants. Another object of this invention is to utilize the electrically defined narrow magnetizing m.m.f., in conjunction with an external feedback loop, to playback or reproduce from a magnetic tape signal previously recorded on it.

Still another object of this invention is to provide a magnetic recording system in which the magnetic field is applied radially with respect to the magnetic medium (i.e. perpendicular to the surface of the magnetic medium), thus passing entirely through it and enabling the whole m.m.f. of the magnetizing field to contribute to magnetizing the tape.

Yet another object of this invention is to provide a static rotating or traveling field transformer.

Yet another object of this invention is to provide a rotating field transformer and to produce a moving distribution of magnetomotive force within the transformer which remains constant in amplitude as it moves as a traveling wave along the transformer primary.

The traveling field transformer (TFT), as will be apparent, is basic to the operation of the magnetic tape-recording system. However, it has other applicability as a static commutator in general and, in particular, as a power source for a planar power-distributing system. In conjunction with a traveling field recording head (TFRH), a TFT can be used to control a magnetic beam, formed by the TFRH, for storage and read out in computer systems, just to mention a few applications in addition to its use in a tape-recording system.

Briefly, the traveling field transformer utilizes two primary coils which are mounted in a pole structure such that the axes of the two coils are 90° apart, which relationship is conventionally described as "orthogonal." In turn the signals applied to each of these coils are 90° out of phase respectively. Each signal is cyclical.

In an important aspect of the primary coil relationships the coil windings are such that their number and distribution approximate a sinusoidal wave, the total effect of which, when excited by time quadrature currents, is to produce a rotating magnetic field. The magnetic field so produced extends radially with respect to the magnetic coil supports or perpendicularly away from the planes containing the conductor elements; for ease of visualization, if the two primary coils were mounted on a toroid, the magnetic path of the conductor plane would extend radially toward the center of the ring thereformed as opposed to the magnetic path in a conventional transformer which would be axial along the path of the toroid. Furthermore, the intensity distribution or "shape" of the moving magnetic field in space is a replica of the current wave form in time flowing in the two-phase primary. Thus, a two phase sinusoidally distributed winding mounted in a magnetic core can be used to convert a function of time into a function of space.

The traveling field transformer (TFT) comprises a slotted annular magnetic core and a two phase, two pole distributed primary winding located in the slots. The magnetic circuit is completed by a second annular core piece which bridges the slots, closing them. Exciting the two phase primary with currents in time quadrature produces a rotating flux wave of constant amplitude in the core. The shape (intensity distribution) of the flux wave is identical to the current waveform driving the transformer load. A distributed secondary winding, also located in the core slots, cuts the lines of the revolving flux wave, inducing a secondary voltage into this winding. The voltage is split or divided into multiple phases depending on the secondary winding configuration. It can have just two phases, or as many phases as there are core slots. With a connection of the latter type, the secondary voltages approximate a traveling voltage wave. In a modified embodiment of the TFT, an auxiliary primary is included in addition to the main primary. The auxiliary primary provides a means for producing small phase displacements of the main primary flux distribution by high-frequency currents without substantially altering the shape of the main distribution.

In the case of the tape recorder system, main and auxiliary primary coils of a TFT having this embodiment are energized with suitable signals so that the moving magnetic field produced, induces phase modulated currents in a two phase secondary. A pair of two phase stator windings in the recording head, respectively driven from the secondaries of TFT's, reestablishes the traveling magnetic field from each TFT. The recording head applies the resultant traveling field to the magnetic tape, the magnetic field being perpendicular to plane of the stator windings and moving transversely with respect to the tape.

The resultant, modulated field is applied to the tape through a traveling field recording head (TFRH). The TFRH comprises a slotted annular magnetic core and a dual, two phase, four-pole distributed stator winding located in the slots. The magnetic circuit is completed by a second annular core piece which bridges the slots, closing them. It also contains a shallow notch equal in length to the tape width, for admitting the tape to the region of magnetic field (the aperture). Aperture edges are shapes and tapered to concentrate the magnetomotive force produced by the stators and appearing across the aperture, to a narrow width. Tape passing through the aperture is magnetized across its width in the perpendicular direction by a slender alternating m.m.f. beam passing along the aperture. The beam is synthesized from two individual rotating m.m.f. distributions, each produced by one stator.

In the preferred embodiment the m.m.f. distributions have sawtooth shapes, corresponding to the sawtooth current applied to each stator. With no phase modulation present, the two traveling m.m.f. distributions subtract, and no net m.m.f. appears across the aperture. If cyclic equal and opposite phase modulation is impressed on each sawtooth distribution by passing it through a TFT, operating as a phase modulator, subtraction is no longer complete and an alternating m.m.f. beam results.

Information previously recorded is read off the tape with the aid of a two phase playback winding located in the core slots immediately beneath the aperture. In conjunction with an external feedback loop and the m.m.f. beam, the playback winding is used to supply an error signal for tracking the remnant flux wave in the tape, thus reproducing it.

With a conventional recording head the width of the magnetizing field (in the direction of relative head to tape motion) is determined by the width of a mechanical gap in the magnetic circuit of the recording head. In the present invention the field width is essentially determined by the retrace time of two sawtooth shaped traveling m.m.f. waves (distribution) from which the magnetizing m.m.f. is synthesized. Since the retrace time depends on the resonant frequency of the stator pole phase winding, it is an electrical parameter rather than a mechanical one.

In a modified embodiment of the TFRH, the magnetic core, instead of being annular, is laid out flat, allowing tape passing through the aperture to remain flat instead of having to be bent in an arc.

The revolving field recording system is an all electronic method of magnetic recording and is generally applicable to all areas of magnetic tape recording, and specifically to the simplification of video recording.

In another embodiment of the invention utilizing the TFT, a planar power distribution system (PPDS) is provided as a simplified means for supplying electrically powered vehicles operating energy when the vehicle path on a two-dimensional surface is unrestricted. The surface consists of a parallel array of closely spaced, flat metallic strips. A vehicle makes conductive contact with these strips. The strips are energized from a TFT secondary, and connected to produce a traveling voltage wave. On the operating surface, a large potential difference appears between conducting strips separated by distances equal to the wheel base length, while a small potential difference appears between adjacent strips. A vehicle makes conductive contact with the surface at the points at which the wheels touch the surface. The on-board vehicle voltage is obtained by adding the voltages appearing across the length and width dimension of the wheel base. An on-board transformer sums the longitudinal and transverse voltage contributions. The resultant output voltage, substantially independent of vehicle orientation, is available for operating the vehicle traction and steering motors. This system is intended as a means for powering toy or model vehicles which can be remotely maneuvered on the surface.

Other objects as well as a more complete explanation of this system will be apparent from the following description taken in connection with the following drawings in which.

Figure 4A:
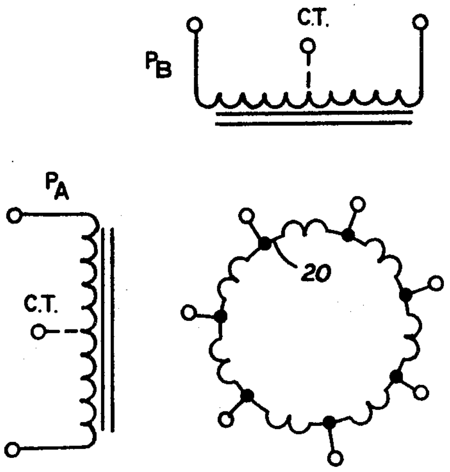
Figure 4B:
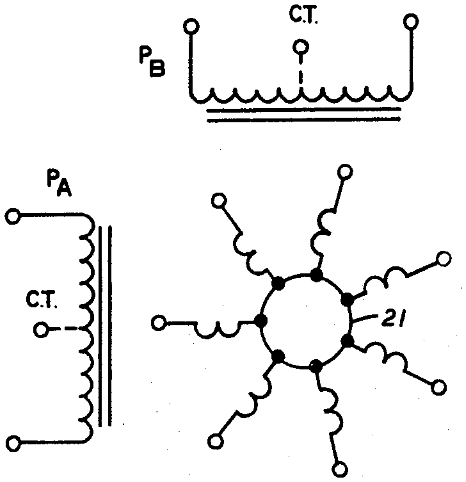

FIGS. 4*a* and 4*b* are schematic diagrams of two forms of traveling field transformers.

Figure 5A:
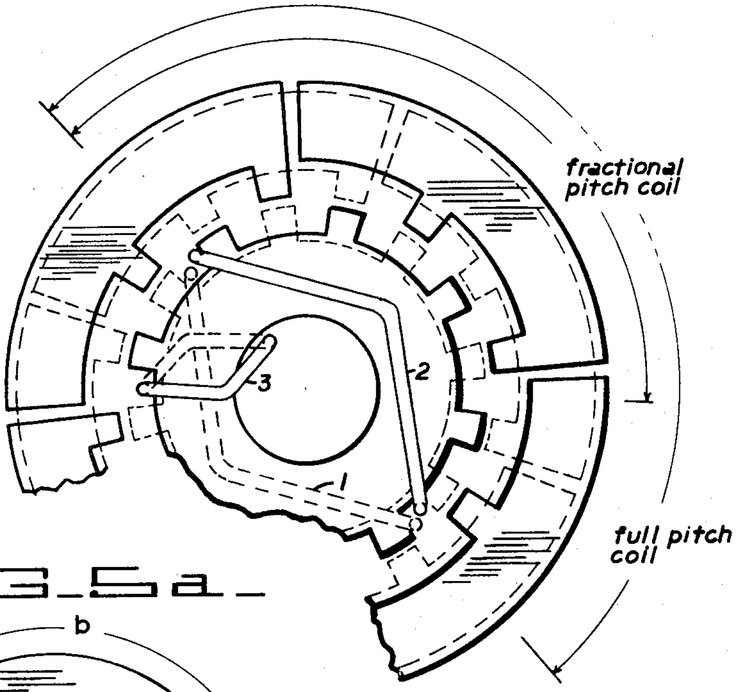
Figure 5B:
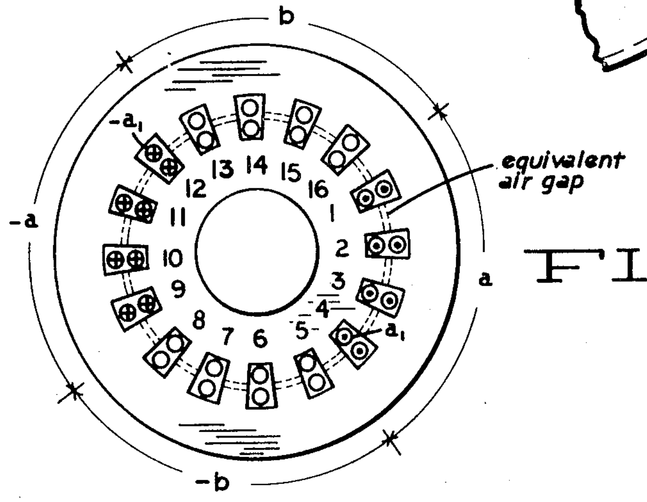
Figures 5C, 7A, 7B:
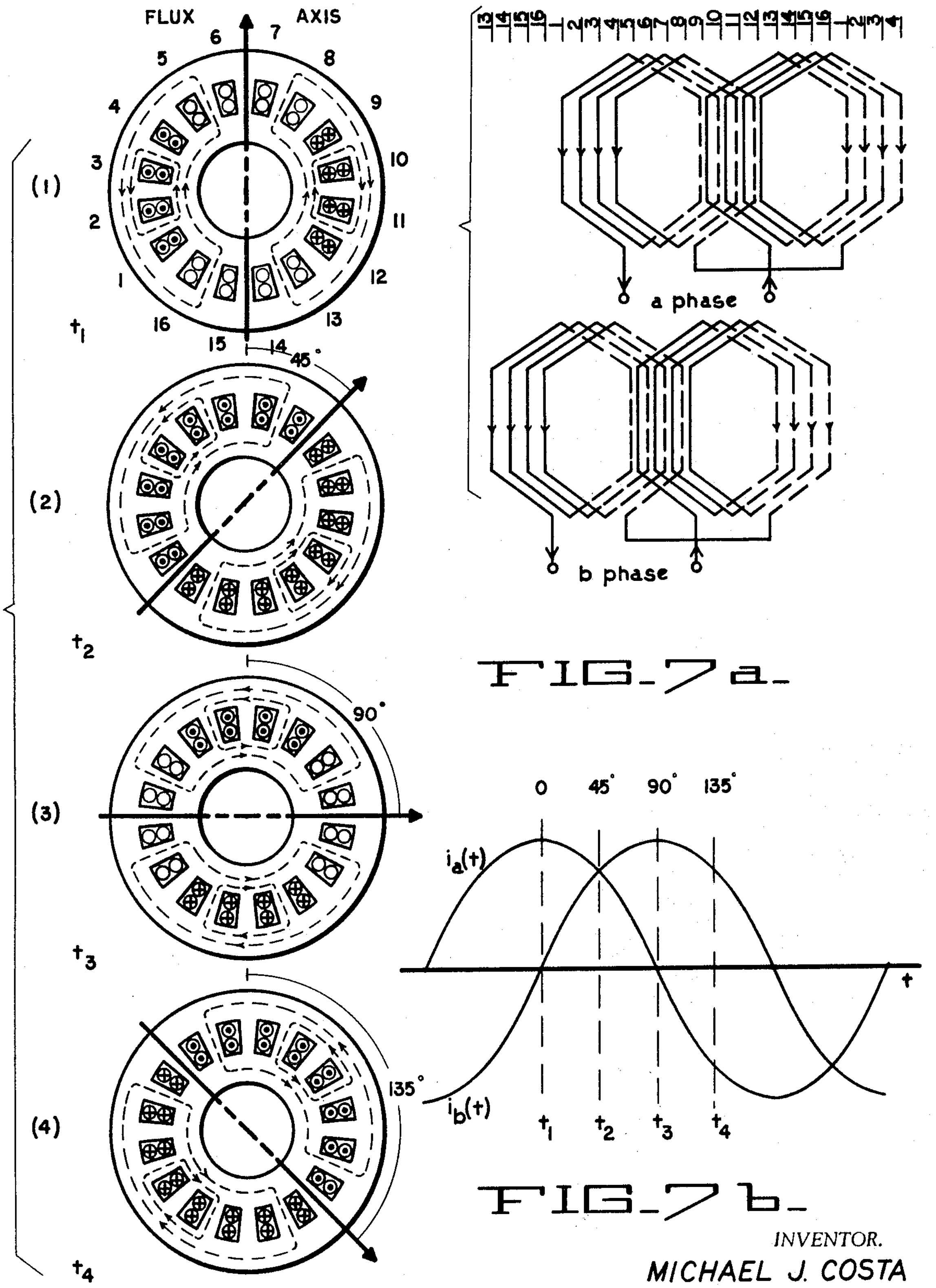

FIGS. 5*a–c* are diagrams illustrating core structure and winding.

FIGS. 6*a–d* are diagrams-illustrating magnetic waveforms produced with reference to the coil windings.

FIGS. 7*a* and 7*b* are diagrams illustrating primary winding configuration and the m.m.f. developed thereby.

FIG. 8 a is a diagram of a dual phase TFT.

FIGS. 8*b–d* are diagrams relating to the production of and waveforms in the dual phase TFT of FIG. 8*a*.

Figure 9A:
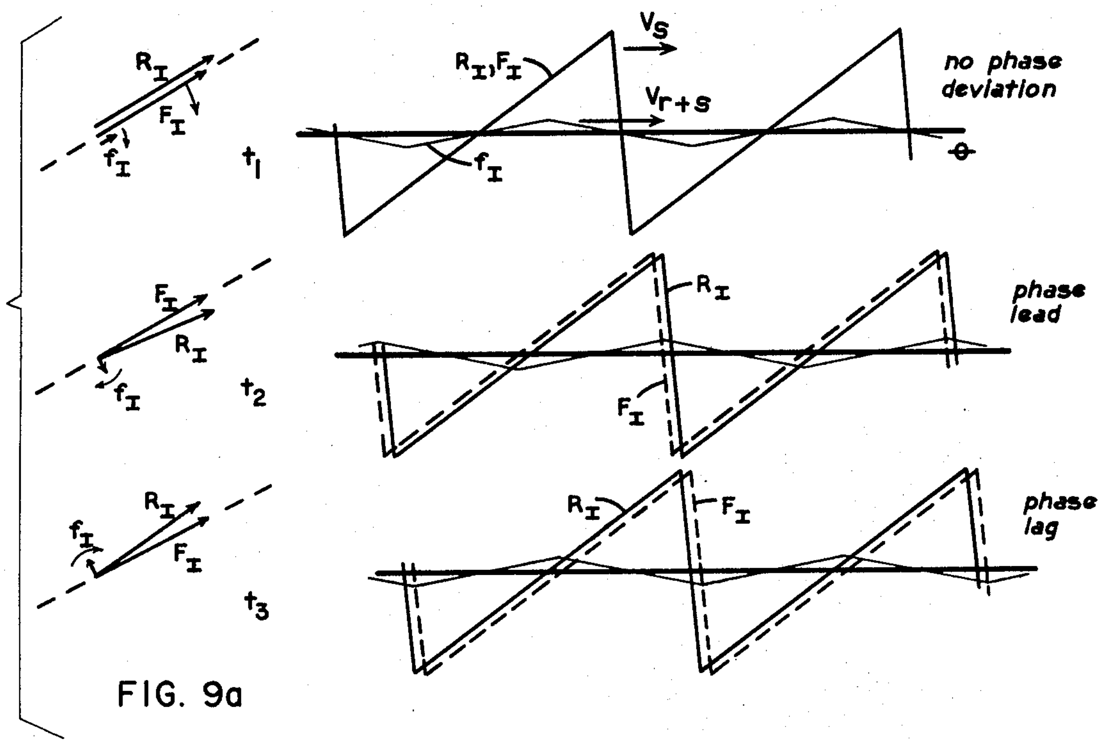

FIGS. 9*a* and *b* are wave form diagrams illustrating variation in the resultant phase of the sawtooth m.m.f. distribution.

Figure 10:
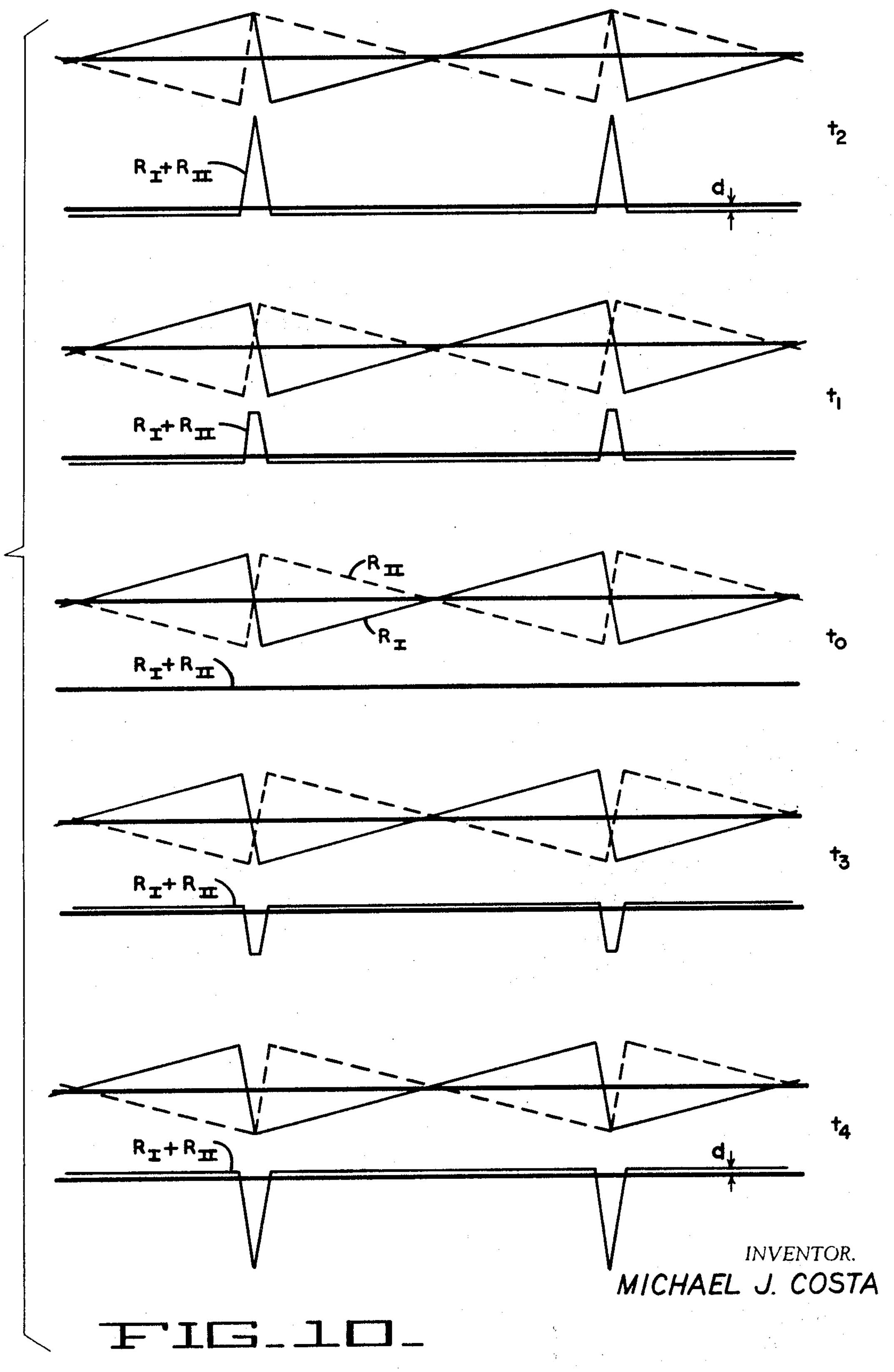

FIG. 10 is a diagram of the resulting m.m.fs. appearing in the TFRH at various instants of time.

FIGS. 11*a–f* illustrate the positions of the playback windings and the signals relating thereto.

Figure 12:
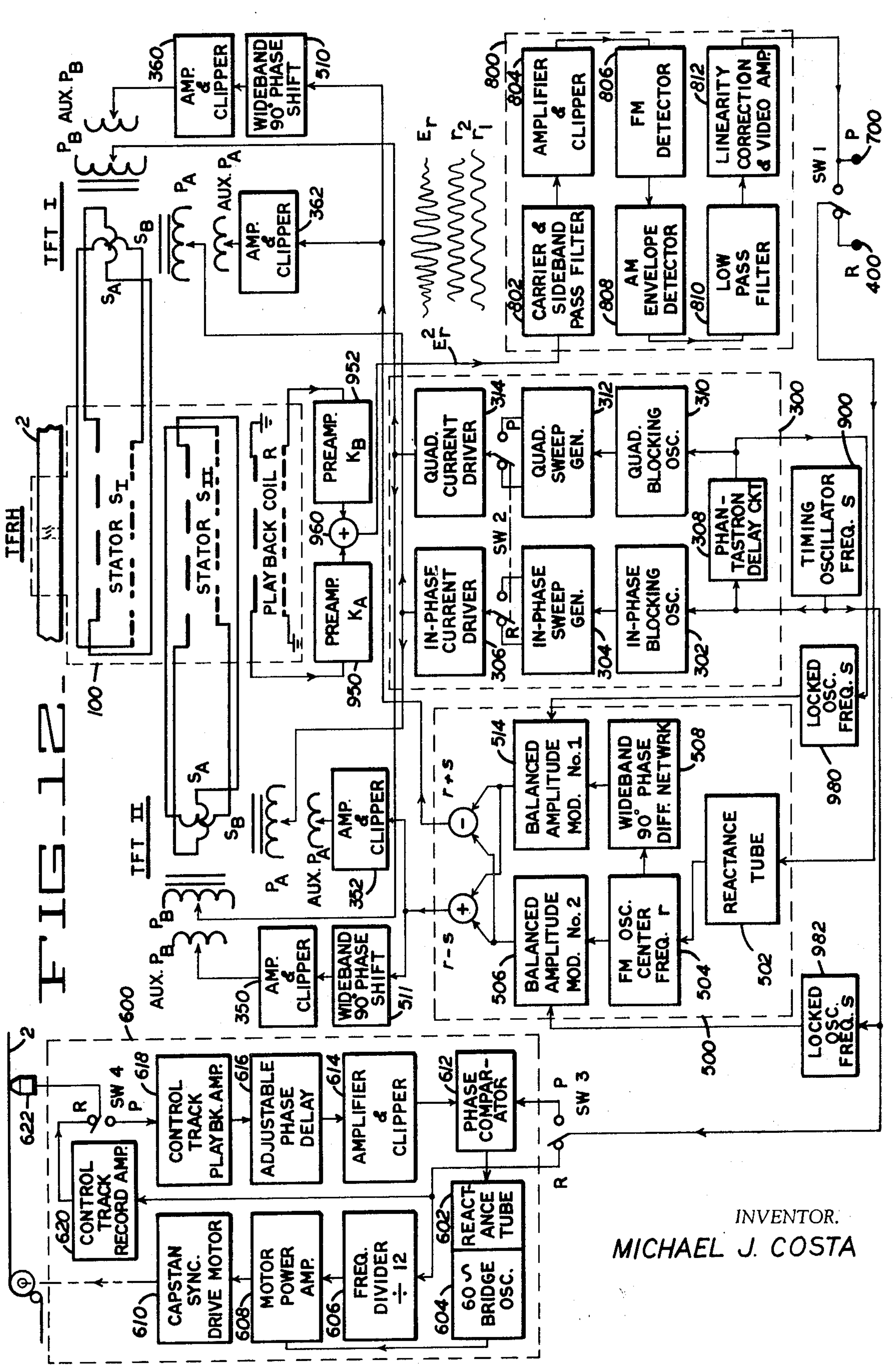

FIG. 12 is a detailed block diagram of my tape-recording system.

FIGS. 13*a–d* are detailed winding diagrams for the TFT core.

FIGS. 14*a–d* are winding diagrams and corresponding waveforms of a two phase stator winding.

FIGS. 15*a–d* are diagrams of an alternative embodiment of my invention illustrating a planar power distribution system.

FIGS. 16*a–d* are diagrams of the vehicle pickup connections and circuits.

Figures 17A, 17B:
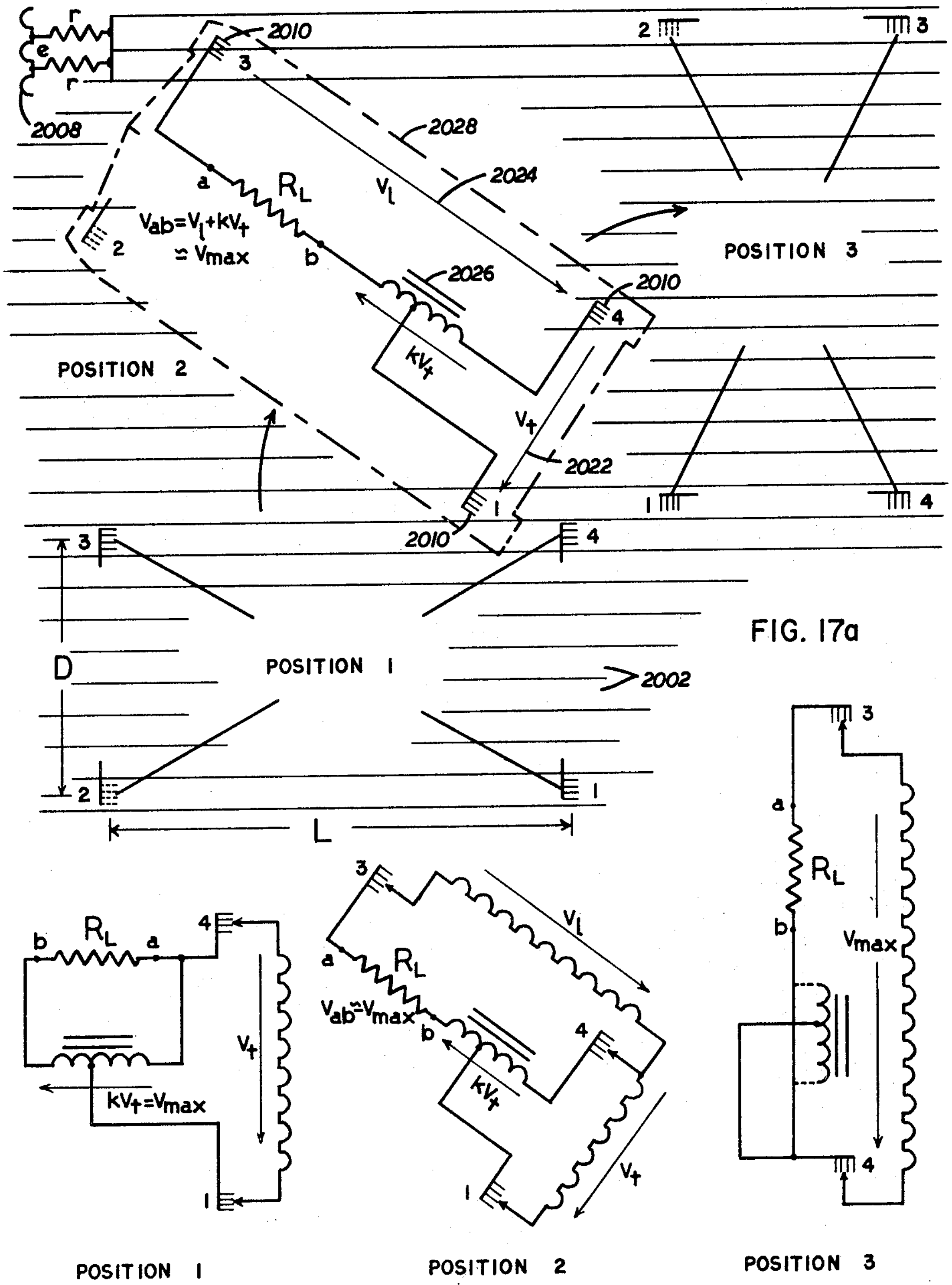

FIGS. 17*a* and *b* are diagrams illustrating the operation of the vehicle at certain positions on the conductor tracks of the distribution system.

TAPE MAGNETIZATION FIELD

Figures 1, 3:
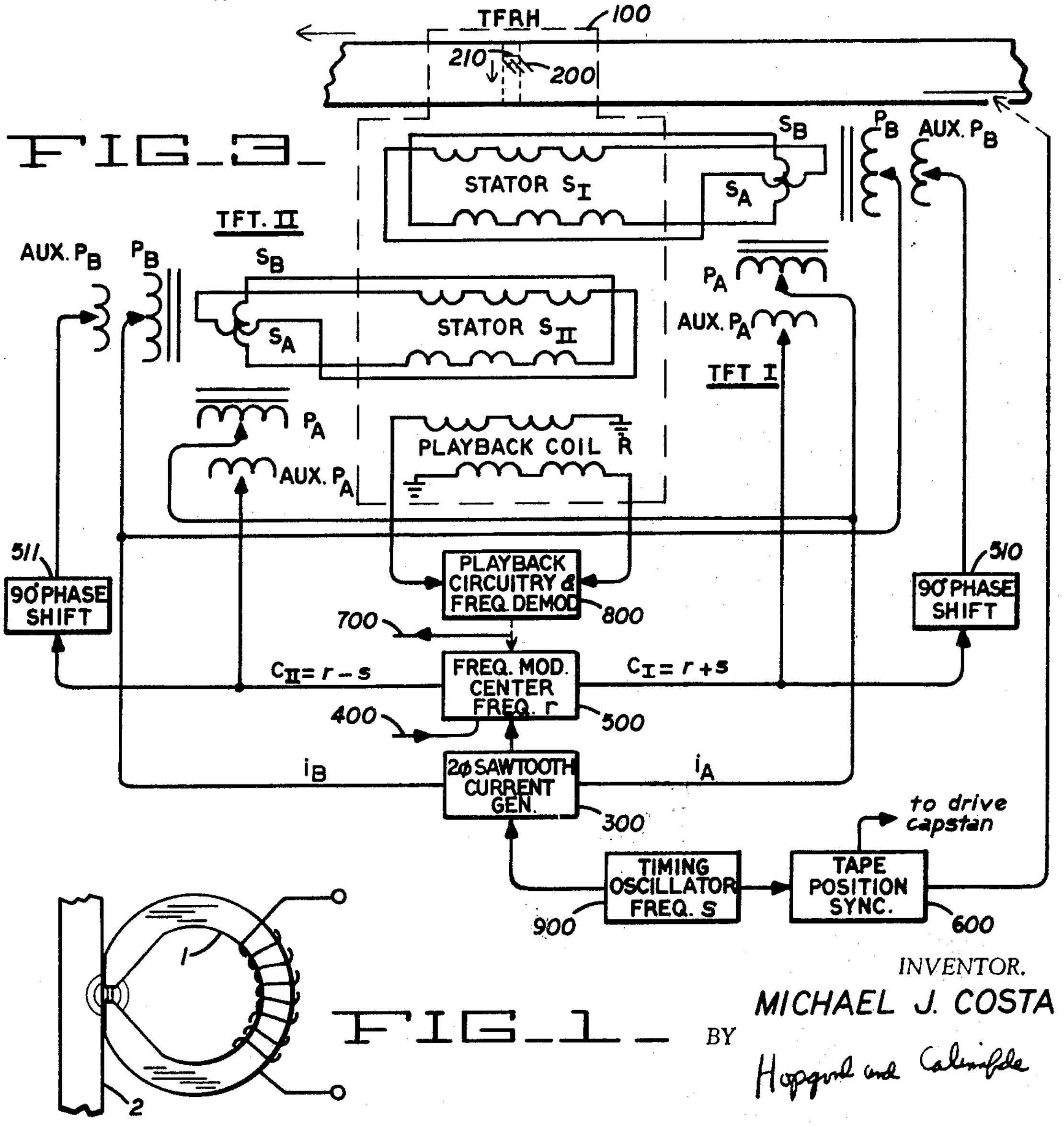
FIG. 1 is a drawing of a conventional tape-recording head.
FIG. 3 is a simplified block diagram of my novel tape-recording system.

As shown in FIG. 1, a conventional magnetic recording field as applied by magnetic means 1 to a magnetic tape 2 comprises a main and backward and forward-fringing field, the recording being applied exclusively by the forward-fringing field. Recording occurs when the forward-fringing field provides a total or net effect of a shift in the axes of magnetization of the domains in the elementary magnetic particles comprising the magnetically sensitive tape coating subject to the field.

Figure 2:
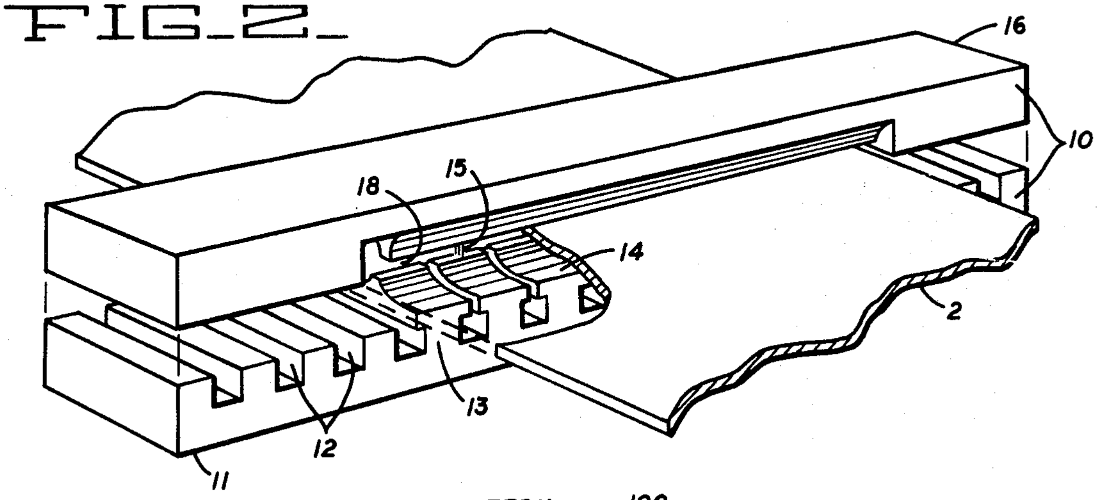
FIG. 2 is a perspective diagram of the magnetic recording head of my invention with windings omitted illustrating the m.m.f. path.

In my invention the magnetizing field is defined in "free space" and is applied perpendicularly into the magnetic tape. In the preferred linear embodiment of my recording head which is shown schematically in FIG. 2 with windings omitted, the core assembly 10 comprises a base 11 terminating in a plurality of slots 12 which receive the coil windings. The base is linear as opposed to being annular. The walls 13 of the slots 12 are shorter in the center region to accommodate tooth caps 14. This center portion may be considered the recording region. The core is flat to facilitate the movement of the tape 2.

The windings are arranged so that the coils are fitted into a predetermined number of slots which occupy a total width defined in terms of the magnetic fields described in more detail later. The number of coil sides or conductors in each slot varies so that the nature and strength of the magnetomotive force (m.m.f.) they produce varies so as to approximate a sinusoidal function along the slot structure. It will also be apparent that the magnetic fields produced are radial (perpendicular to the winding planes) with respect to the flat stator core to produce an m.m.f. beam 15.

A closing core 16 defines a cavity or space 18 through which the tape passes. On the edge that forms the upper boundary of the aperture the closing member has a crown configuration in cross section to narrow the gap in the region at which the recording occurs and to concentrate the field region into a narrow track. Tooth caps 14 perform the same function at the lower boundary of the aperture. The m.m.f. will move longitudinally with respect to the coil windings or along the length of aperture 18, as will be explained.

TAPE-RECORDING SYSTEM

Before discussing the entire tape-recording system in detail, reference is made to FIG. 3 which is a simplified block diagram. There is shown a recording head 100 which applies a narrow magnetizing m.m.f. beam 200 to a coated magnetic tape moving to the left. The beam itself magnetizes a small tape area indicated by block 210. The beam moves tranversely along the tape as indicated by the arrow. Because of longitudinal tape movement, the beam path traversed on the tape is somewhat diagonal.

The recording head is a traveling field recording head (TFRH) and comprises stator coils $S_I$, $S_{II}$, and playback coil R. The physical arrangement of the coils will be considered after the discussion of the overall arrangement has been completed.

Traveling field transformer (TFT) I comprises two orthogonally related primary coils $P_{A-I}$ and $P_{B-I}$ with secondary coils $S_{A-I}$ and $S_{B-I}$. These secondaries drive the two phase stator $S_I$ of TFRH 100.

Traveling field transformer II is essentially similar having primary coils $P_{A-II}$, $P_{B-II}$ and secondary coils $S_{A-II}$, $S_{B-II}$. These secondaries drive the two phase stator $S_{II}$ of TFRH 100.

The major rotating or traveling m.m.f. distributions are established in TFTs I and II by two phase sawtooth current generator 300. This generator applies an "in phase" sawtooth current $i_A$ to primary coils $P_A$ of both TFTs I and II and a 90° phase shifted or quadrature sawtooth current $i_B$ to primary coils of $P_B$ of both TFTs I and II. It also supplies in phase and quadrature reference signals at the sawtooth repetition frequency to frequency modulator 500.

The recursion frequency of the sawtooth currents produced by generator 300 are determined by timing oscillator 900, which oscillates at a relatively low frequency, *s*.

Input signals 400 to be recorded on the tape are applied to modulator 500 where the frequency modulates a carrier having a nominal or center frequency *r*. The resulting FM carrier is additionally shifted in frequency with respect to the timing frequency *s* so that two FM carriers $C_I$ and $C_{II}$ with effective center frequencies $r+s$ and $r-s$, respectively, are produced at the modulator output. Relative to *s*, the carrier frequency *r* is high.

Carrier signal $C_I$ establishes a traveling signal m.m.f. distribution in TFT I through two orthogonally related auxiliary primary coils Aux $P_A$ and Aux $P_B$. Signal $C_I$ is applied directly to coil Aux $P_A$, and following a 90° phase displacement by phase shift means 510, to coil Aux $P_B$.

Similarly, carrier signal $C_{II}$ establishes a traveling signal m.m.f. distribution in TFT II through two orthogonally related auxiliary primary coils Aux $P_A$ and Aux $P_B$. Signal $C_{II}$ is applied directly to Aux $P_A$, and following a 90° phase displacement by phase shift means 511, to coil Aux $P_B$.

Signals recorded on the tape are recorded in conjunction with two phase playback coil R and playback circuit means 800, in which a frequency demodulator constitutes a major element. When connected to modulator 500, means 800, 500 and TFT I, II form an external feedback loop around TFRH 100. With m.m.f. beam 200, this loop is used to obtain a playback output 700 from the tape that is a reproduction of the original signal recorded on the tape.

In playback operation tape position, synchronizer 600, through the capstan tape drive motor, synchronizes longitudinal tape velocity with the transverse transport of m.m.f. beam 200 across the tape. This is done by comparing timing frequency *s* from oscillator 900 with a similar signal recorded on a margin of the tape during record operation.

In order to understand the operation of the recording head TFRH 100, as well as the traveling field transformers I and II, and for diagrams of representative mechanical configurations reference is made to FIGS. 4 and 5.

TRAVELING FIELD TRANSFORMER

FIG. 4a is a schematic diagram of the traveling field transformer, the secondary 20 is shown mesh connected, otherwise termed a generalized delta connection. In FIG. 4b, the secondary is shown star connected (it can also be considered a generalized Y connection). The primaries $P_A$ and $P_B$ are two phase primaries. A center tap connection is indicated on each single phase primary winding to note that the transformer can be excited from a push-pull source.

The traveling field transformer is central to the operation of this invention as well as all of its embodiments. The primary of the traveling field transformer, as well as the stator of the traveling field recording head (TFRH), employ two phase windings exclusively positioned orthogonally. Consequently, there is no interaction between phase windings and the resultant m.m.f. is a simple vector sum of the m.m.f. produced by each phase. This property of a two-phase winding makes production of a constant rotating or traveling m.m.f. wave possible with an arbitrary driving current; whereas a three phase winding necessarily produces interaction between phases because of the nonzero projection of the axis of any one phase on the axis of the other two. Consequently, not all current waveforms can be ideally translated into traveling m.m.f. waves with three phase windings.

The TFT and TFRH each have essentially the same magnetic circuit. Magnetically, both consist of an annular core structure within which a rotating field is established. In order to establish this rotating field, the following three conditions must be met:

1. The magnetic axis of each of the two single phase windings comprising the complete two phase primary or stator winding must be orthogonal. For the TFT, which has a two pole primary, orthogonal magnetic axes also means that the two magnetic axes are at right angles in space. However, for the TFRH, which has a stator with four or more poles, the magnetic axes are no longer at geometrical right angles in space. Instead, for multipolar windings (more than two poles), orthogonal implies that neither phase winding produces a net flux through the other, so that the two windings remain uncoupled.

(Also standard terminology is used in referring to the number of poles produced by a winding. That is, the number of poles refers to the poles produced by the winding of one phase. Thus, the two phase, two pole TFT physically has four magnetic poles produced about its core—two by each phase, although the primary is termed a two pole winding).

2. The currents exciting each single phase winding must be 90° apart in time phase.

3. The magnetomotive force, produced by each single phase winding excited separately, must be sinusoidally distributed along the magnetic center plane of the core. The magnetomotive force acts in the radial direction, establishing a magnetic flux through the center plane (circumferential air gap) of the core structure. Thus, the flux density produced at the center plane by a single phase winding acting alone must have a sinusoidal variation with angle around the center plane.

These three conditions required to establish a rotating field apply equally to the TFT and the TFRH.

CORE

For applications at power and audiofrequencies, a TFT is made from a stack of electrical sheet-iron laminations. At higher frequencies, a ferrite core is used. A TFT designed for a low-frequency application can be assembled from iron laminations. The inner core stack is built up from circular pieces having every other circumferential tooth missing, FIG. 5*a*. The core is completed by fitting the outer core pieces, which also have every other tooth on their inner circumference missing, into matching tooth vacancies on the inner core. An outer core layer is comprised of four segments, each one covering 90° of arc. The outer core is completed after the primary and secondary windings have been set into the slots located on the circumference of the inner core. The final structure is an annular magnetic core containing a series of windows and slots running parallel to the core axes for accommodating the primary and secondary conductors. (FIG. 5*b*).

FIG. 5 also shows the positions of several coil elements from which the primary and secondary windings are formed. The primary winding is made up of double-layer coils having the span of a full pole pitch. The coils numbered 1 and 2 in FIG. 5 typify a double-layer primary winding element. The full line represents the front end connection; both are completed outside the core. Coil location 3 represents one of two possible positions of a representative secondary coil. The left side of coil 3 is fixed in one slot, while the right side of the coil is shown skewed to one side. The skew indicates that oversized secondary coils are used, purposely made large, to permit threading an inner core of semicircular laminations through them. After the inner core has been assembled within them in this manner, the secondary coils are positioned in the slots and tightened against the core by skewing them to one side. Another position of a secondary coil places it in a pair of full pitch slots and in essentially the same location as one of the primary winding elements, i.e. the right-hand side of coil 3, would instead be located in a slot diametrically opposite the slot in which the left-hand side is shown located in the figure. In a completed transformer, each slot contain the sides of two primary coils, plus the sides of either 1 or 2 secondary coils, depending respectively on whether these coils occupy type 3 positions or positions similar to the primary coil elements. One coil (the basic winding element) contains a number of turns of wire. The secondary coils may be connected in generalized mesh as illustrated in FIG. 4*a* or a generalized star or Y as illustrated in FIG. 4*b*.

MAGNETOMOTIVE FORCE OF A DISTRIBUTED WINDING

The manner in which a distributed winding, i.e., a winding which is spread over a number of slots around the periphery of the core, produces an m.m.f. that varies sinusoidally in space around the core will be described in this section.

Figure 6A:
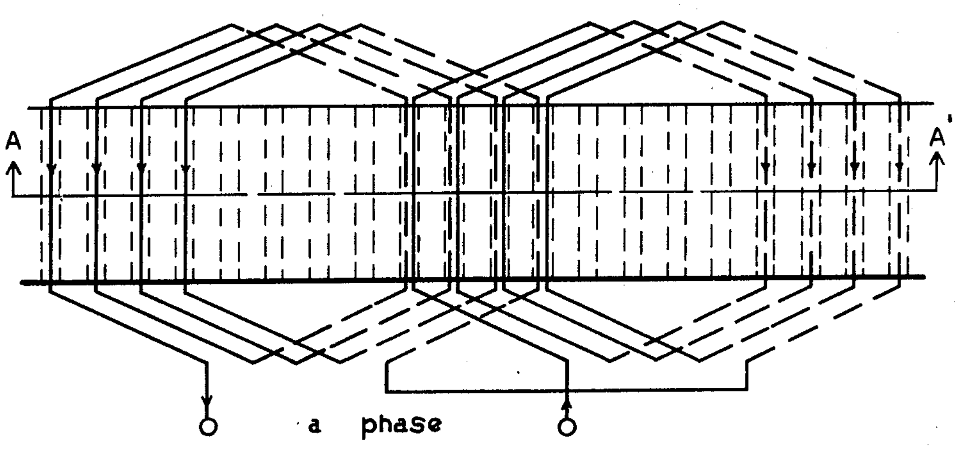
Figure 6B:
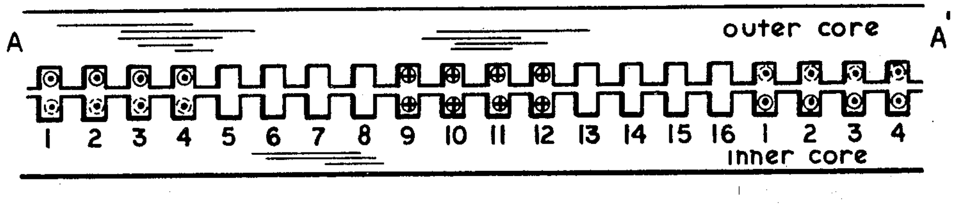

FIGS. 6*a* and *b* show in cross section phases *a* and *b* of the primary winding of a sixteen-slot, two-pole TFT. Secondary coils have been omitted. The windings of each phase are identical and are located with their magnetic axes 90 electrical and mechanical degrees apart. Each phase winding is made up of individual coils, similar to coils 1 and 2 in FIG. 5, interconnected so that two belts of conductors result. The belts, located in the slots, carry oppositely directed currents parallel to the core axis and are arranged to produce a pair of poles. The current directions are shown by dots and crosses indicating current toward and away from the plane of the paper, respectively. To facilitate the identification of the two phases, only the *a*-phase conductors are shown carrying current, while phase *b* remains unexcited.

The primary winding is arranged in two layers, each coil having one side in the top of a slot and the other side in the bottom of another slot, half a wavelength of flux away, as indicated by the two representative coil sides $a_1$ and $-a_1$ in FIG. 5*b*. A two layer arrangement simplifies the geometrical problem of getting the end turns of the individual coils past each other. FIG. 6*a* shows the end turns and the interconnections among the individual coils of the a-phase in developed form, i.e., laid out flat. Full lines represent coil sides occupying top positions in a slot and dashed lines represent coil sides occupying bottom positions.

FIG. 5*b* also indicates an equivalent airgap circling the core. The gap originates in the joint between the inner and outer core members at the mean radius of the core teeth. This equivalent airgap is, by virtue of symmetry, also the magnetic center plane of the core. Since the permeability of the inner and outer core iron is much greater than that of air, it is sufficiently accurate to assume that all the reluctance of the magnetic circuit is in the equivalent airgap. Also, assuming a uniform airgap, it is evident from FIG. 6*b* that the magnetic field intensity H in the airgap at angle $\theta$ is the same in magnitude as that at angle $\theta+\pi$, but directed in the opposite direction from the field at angle $\theta$.

Figures 6C, 6D:
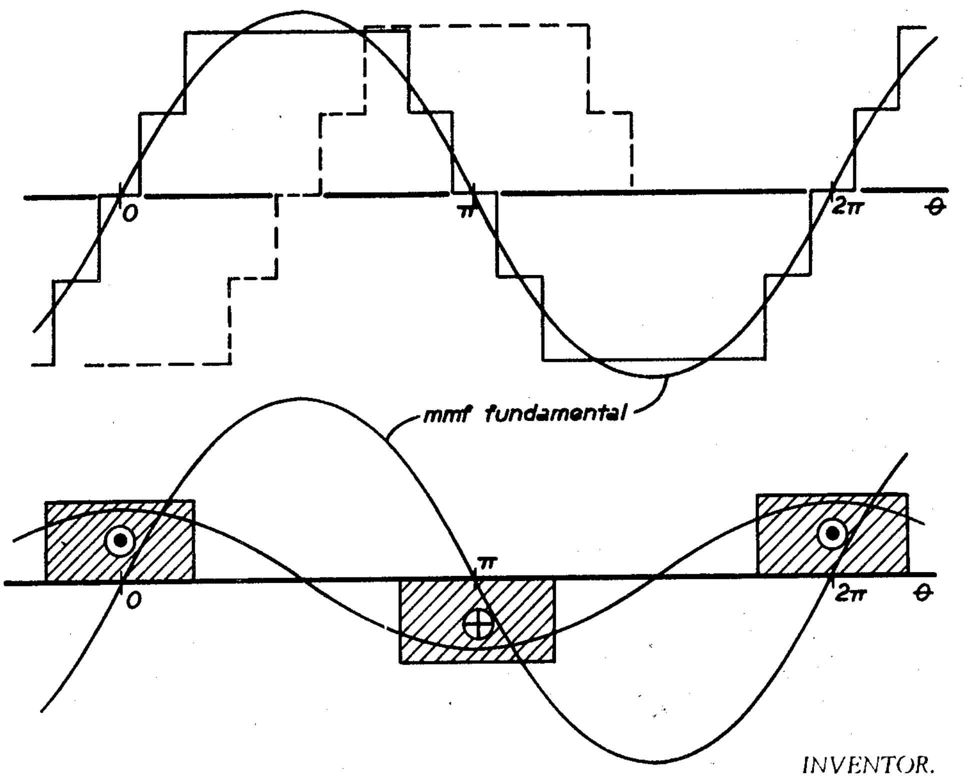

FIG. 6*c* is a plot of the airgap m.m.f. distribution produced by the *a*-phase primary winding. It consists of a series of steps and is the m.m.f. that would appear across the equivalent TFT airgap as a function of angle if a DC current were passed through the *a*-phase winding. It is also the instantaneous m.m.f. distribution produced by the *a*-phase winding if this winding is excited by an AC current. In the latter case, the amplitude of the m.m.f. distribution of FIG. 6*c* will vary in time, following the waveform of the exciting current, while the distribution axis remains stationary in space. The fundamental component of the spacial m.m.f. distribution is also shown in FIG. 6*c* and is repeated again in FIG. 6*d* where it is shown in relation to the equivalent current sheet of the *a*-phase winding. From FIG. 6*d* it can be seen that the fundamental of the spacial current distribution gives rise to the m.m.f. fundamental. If a primary winding geometry is used which yields a sinusoidal variation of current density with angle around the core, the resulting m.m.f. distribution in space will also be sinusoidal, with no harmonics and condition 3, previously mentioned, will be fulfilled, rather than just approximated. The accuracy with which a particular type of winding produces a sinusoidal spacial current distribution is measured by the degree of harmonic suppression the winding exhibits.

The m.m.f. produced by the *b*-phase winding is indicated in FIG. 6*c* by the dashed line distribution, although the *b*-phase conductors have been omitted in the *a* and *b* portions of FIG. 6. It is seen to be in space quadrature with the *a*-phase m.m.f. distribution as required by condition 1.

In this section, the TFT primary winding is described in terms of a full pitch, double layer, lap winding. (The coil pitch is the distance between two sides of a coil measured in pole pitches on the periphery of the inner core. When the coil pitch is equal to a pole pitch, the winding is called a full pitch winding. When the coil pitch is smaller than the pole pitch, the winding is called a fractional pitch, or chorded winding; see FIG. 5*a*.) For reasons of economy a lap wound primary constitutes a preferred winding. The economy stems from the use of identical coils in making up the complete winding. Each coil is the same size and has the same number of turns. While a full pitch winding was used in the explanation to avoid unnecessary complication, a fractional pitch winding reduces space harmonics and is preferred. Fractional coil pitch produces a spacial current distribution that more closely approximates the sinusoidal current distribution shown in FIG. 6*d* than does the "box" current distribution of a full pitch winding. Physically the effect of fractional pitch is to mix coil sides from both *a* and *b* phases in some slots. From FIG. 5*b*, it can be seen that full pitch coils place only pairs of coil sides from the same phase in a slot. A similar drawing for fractional pitch coils would show some slots occupied by one coil side from phase *a* and a second from phase *b*. It is this mixing that is described by the term "distributed winding;" strictly speaking, the phase windings in FIG. 5*b* are concentrated windings.

The three references cited below contain tables and curves for selecting the coil pitch to achieve the greatest harmonic suppression in a primary winding with a given number of slots per pole. They also contain design data for the remaining two general winding types from which the primary may be wound: (1) A concentric winding and (2) a wave winding. Both type also approximate, with different degrees of precision, the spacial, sinusoidal current distribution of FIG. 6*d*.

1. A. E. Knowlton, *Standard Handbook for Electrical Engineers*, 9th Ed., McGraw-Hill, 1957, Sec. 7.

2. M. Liwschitz-Garik, *Winding Alternating Current Machines*, D. Van Nostrand Co., 1950

3. A. S. Langsdorf, *Theory of Alternating Current Machinery*, 2nd Ed., McGraw-Hill 1955, p. 207.

TRAVELING MAGNETIC FIELD PRODUCED BY 2-PHASE PRIMARY

The previous section described how required conditions 1 and 3 are realized in the TFT. This section shows how a rotating magnetic flux is established in the core of a TFT when the final condition exciting the two phase primary with time quadrature currents is satisfied.

Up to this point the discussion has been in terms of magnetomotive force, the magnetic potential difference which establishes a magnetic flux in the core. Because the voltages induced in the secondary coils are produced by a changing flux field or lines of induction through the secondary coils, it is convenient to deal with the flux distribution produced by the m.m.f. distribution, rather than the m.m.f. distribution itself. Magnetomotive force, flux and reluctance are the magnetic circuit analogs, respectively, of the electric circuit quantities: electromotive force, current and resistance, i.e., Magnetomotive force, m.m.f.: the analog of electromotive force, e.m.f.

magnetic flux, Φ: the analog of electric current, *i* magnetic circuit reluctance, R: the analog of electric resistance, *r*.

The three magnetic quantities are also related in the same way that Ohms Law relates e.m.f., current and resistance. Consequently, the flux density distribution across the TFT center plane produced by a current in either phase winding is a sinusoidal function of distance along the center plane (to the same approximation that the m.m.f. distribution is sinusoidal) and is related to the m.m.f. by:

$$\phi(\theta)=\frac{1}{R}MMF(\theta)$$

where the reluctance is taken to be a constant, independent of angle. The flux distribution may be represented diagrammatically by lines of force threading through the TFT core in paths that take a given flux line across the equivalent airgap twice, once leaving the inner core and once returning to it.

FIG. 7*a* shows four views of the sixteen-slot TFT in cross section. Each view is essentially the same as that of FIG. 5*b*, but now both phase windings are excited by time quadrature currents and each view corresponds to one of four different instants of time. Each view shows the instantaneous current directions in the various conductors and the corresponding instantaneous flux fields set up in the core at each of the four different instants of time. The instantaneous resultant flux field is set up by the combined effect of currents flowing in both windings at that particular moment. Also shown in FIG. 7*a* is the complete two phase, full pitch, double-layer primary lap winding. Pairs of coil sides in this fully developed view of the two phase primary winding are numbered to correspond to the TFT slots they occupy. Again only primary coils are shown in FIG. 7*a*. FIG. 7*b* shows the time quadrature currents that excite the two phase primary. A sinusoidal current waveform is shown but it is emphasized that this is only a special case, any repetitive two phase current waveform can be used to produce a rotating field in the TFT. Each of the views 1, 2, 3, and 4 in FIG. 7*a* corresponds to the current and flux conditions in the core at the instants of time $t_1$, $t_2$, $t_3$, and $t_4$, respectively, marked in FIG. 7*b*. Now, consider the evolution of the resultant induction field in space and time as the TFT primary is excited by currents $i_a$ and $i_b$:

*At* $t_1$: $i_a=i_a$ max, positive; $i_b$ is zero $t_1$ fixes initial conditions In the developed view of the primary in FIG. 7*a*, active conductors carry current in the direction of the arrows. In the core, application of the right-hand rule shows that the active conductors set up lines of force as shown by the arrows on the dotted lines representing flux.

*At* $t_2$: $i_a=i_a$ max/$\sqrt{2}$, both positive $t_2$ 45° later in time than $t_1$ In the developed view of the primary, the conductors carry currents in the direction of the arrows. In the core, use of the right-hand rule again gives the flux pattern shown. Flux distribution is seen to have shifted 45° in space.

*At* $t_3$: $i_a$=0; $i_b=i_b$ max., positive $t_3$ 90° later in time than $t_1$ In the developed view of the primary, the active conductors carry current in the direction of the arrows. In the core, the right-hand rule gives the flux position shown. Distribution has shifted another 45° in space.

*At* $t_4$: $i_a=-i_b=1i_a$ max$^1$/ $\sqrt{2}$ $t_1$ 135° later in time than $t_1$ In the developed view of the primary, the a-phase conductors carry current in direction opposite to that of the arrows. Use of the right-hand rule shows that the distribution has moved another 45° in space for a total rotation of 135° from the position it had at time $t_1$. Thus, there is set up through the TFT center plane (across the equivalent airgap) a flux distribution that rotates in space, but is produced by a stationary structure excited by two currents, 90° out of time phase. When excited by sinusoidal currents, the density distribution of the flux across the air gap varies sinusoidally with distance along the gap. More generally, the flux density distribution is always a special replica of the current waveform delivered to the transformer load.

As a function of time, the flux distribution across the equivalent airgap rotates uniformly, completing one revolution about the gap in the time of one period of the exciting current, i.e., $$n=2s/P \text{ rev./sec.}$$

where $n$ is the rotational rate of the radial flux distribution around the TFT equivalent airgap.

$s$ is the frequency of the current driving the TFT load (cycles/sec.)

$P$ is the number of poles in one phase winding of the primary ($P$=2).

TFT SECONDARY WINDING

The rotating m.m.f. distribution produces a flux through the TFT equivalent airgap which varies periodically in time, completing one cycle in the time of one revolution of the m.m.f. axis about the TFT core. FIG. 7*a* indicates how secondary coils located in either positions 1, 2 or 3 (in FIG. 5*a*) are linked by a time varying flux. Changing flux linkages induce voltages in the secondary coils. The induced voltage waveform is a replica of the special flux density distribution. Thus, if the flux distribution is sinusoidal because the sinusoidally distributed primaries are driven by sinusoidal currents, the induced voltage is sinusoidal also. If the flux density distribution has a sawtooth variation because the sinusoidally distributed primaries are driven by sawtooth currents, the induced voltage also has a sawtooth waveform.

WINDINGS

Various other coil windings will occur to those skilled in the art in accordance with the general principles disclosed. However, it will be noted that in all cases the windings are arranged so that their concentrations in respective slots produce an m.m.f. that varies sinusoidally in space. This condition is met, in general, and in the embodiments specifically disclosed, when the windings have a density which themselves approximate a sinusoidal pattern. Instead of distributing the pole phase winding turns sinusoidally to obtain a sinusoidal variation of flux with distance along the slot structure, the winding density remains constant but the teeth width are sinusoidally varied along the slot structure. For this modification the inner (lower) core member would have the sinusoidal and the outer (upper) core member the cosinusoidal variation. Thus, for a two phase primary or stator winding one phase would be located in one core member and the second phase in the other core member. In a TFRH this variation would require tooth caps on both sides of the aperture.

Generally for a given number of slots per pole, a concentric winding is the closest approximation to an ideal winding, one that produces a sinusoidal variation of current density along the center plane. A wave winding is in many respects similar to a lap winding, each coil of the winding has the same number of turns in it. I have recognized that the rotating field will not be satisfactory when the harmonic suppression is poor and, for this reason, I prefer to use a concentric winding or fractional pitch lap winding; however, I have referred to the fractional pitch lap winding for purpose of illustration.

It will be apparent that various connections of the secondary windings are available to those skilled in the art, including star connections, mesh connections, and the like.

EXCITATION

The two phase primary windings are excited by a two phase power source producing sinusoidal current waveforms. The sinusoidal waveform is only exemplary, since any uniformly repeating two phase current waveform can be used to produce a rotating field. So long as the two phase windings have an approximate sinusoidal distribution in space, the resultant traveling m.m.f. waveform will approximate the waveform of a repetitive input current to the transformer primary.

DUAL PRIMARY TFT

As illustrated in FIG. **8*a***, there is shown two phase primary windings comprising a dual primary TFT, the main primaries establishing the main rotating m.m.f. distribution. The auxiliary primary windings Aux $P_A$ and Aux $P_B$ establish the auxiliary rotating m.m.f. distribution which modulates or perturbs the main distribution.

In this form a TFT consists of six distributed windings: a two phase primary composed of windings $P_A$ and $P_B$, a two phase secondary composed of windings $S_A$ and $S_B$, and an auxiliary two phase primary composed of windings Aux $P_A$ and Aux $P_B$. The auxiliary primary is used for establishing a rotating signal m.m.f. which periodically modifies the instantaneous phase angle of the main rotating m.m.f. produced by the main primary as explained in connection with FIG. 3.

The core for this modification (see FIG. 13) is assembled from low-loss ferrite pieces 70, instead of iron laminations, to accommodate frequency components of up to 10 megacycles, which may be present in both the main and auxiliary primary driving currents. All six windings are mounted in slots 72 located on the periphery of the innertoroidal member 74 of the transformer core structure. FIG. **13*a*** illustrates this core assembly technique.

Figure 13B:
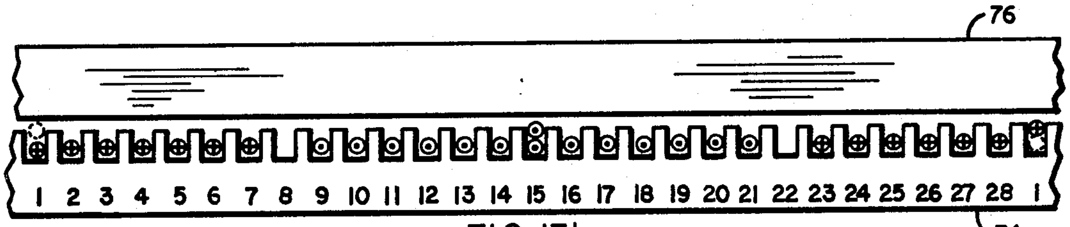
Figures 13A, 13C, 13D:
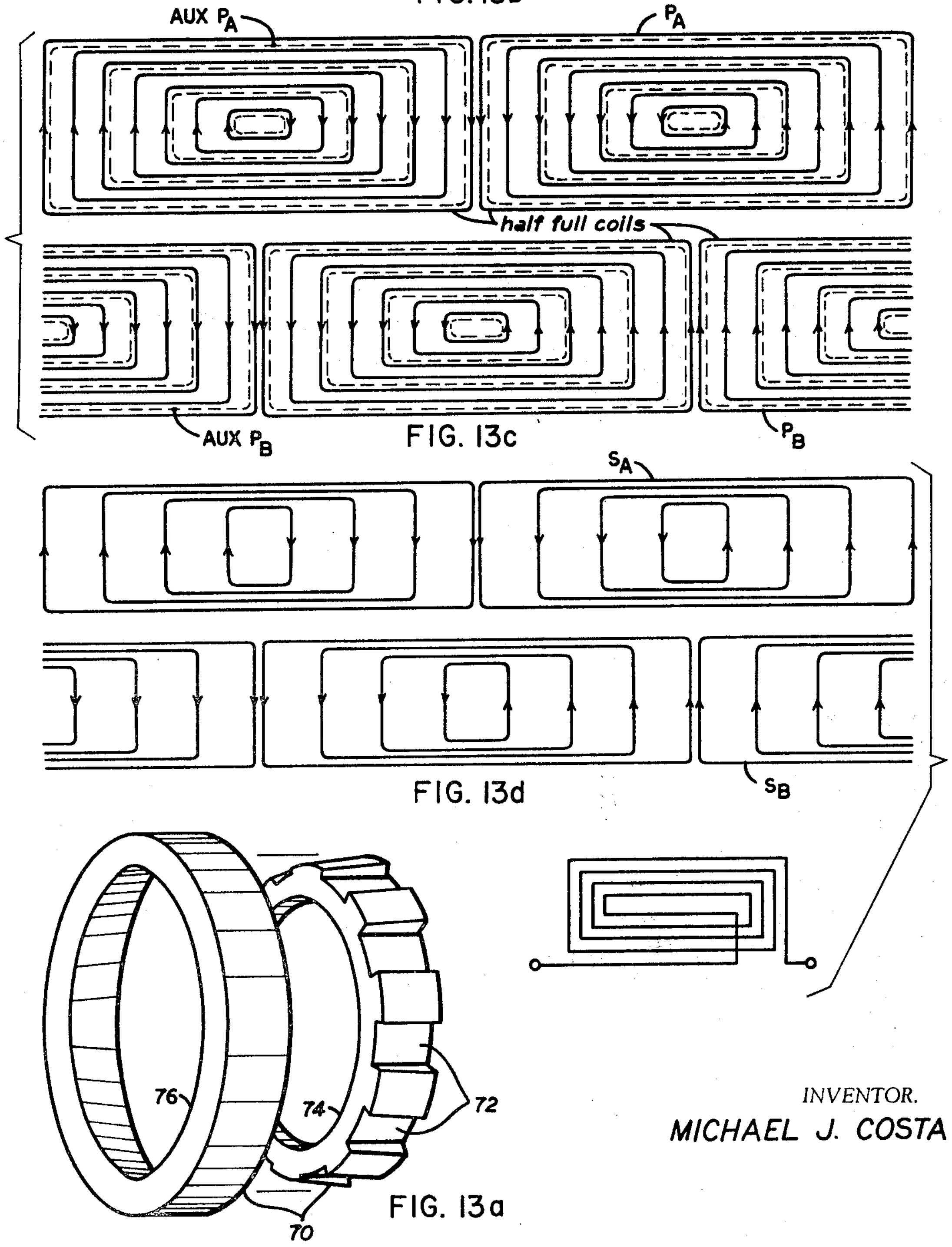

FIG. **13*b* is a developed view of the TFT core. A twenty-eight slot core is indicated; for legibility, slots are shown occupied by only one phase winding of the main primary. The equivalent air gap around the core is also shown. FIG. 13*c* is a developed view of individual coils which make up the two phase main primary. The primary is composed of concentric windings, with individual phases positioned so the m.m.fs. produced by the two windings are mutually orthogonal. A concentrically wound primary, rather than a lap primary, is used because a concentric winding exhibits relatively greater harmonic suppression. A close approximation to a sinusoidal m.m.f. distribution is required in this TFT embodiment because the application necessitates high fidelity in transforming the current waveform. Thus, 14** slots per pole are shown, while in the TFRH only nine slots per pole may be used. The number of wire turns in constituent coils comprising one pole are sinusoidally distributed over the pole span.

An auxiliary primary, having fewer number of coils per pole than the main primary, is illustrated by broken lines in FIG. **13*c***. It is also made up of concentric windings, having sinusoidally distributed turns per coil. A secondary is also shown made up of two phase sinusoidally distributed coils. As with the main and auxiliary primaries, the two phases are mutually orthogonal to one another.

Operation of the dual primary TFT embodiment is identical to that of the basic TFT. Two phase currents applied to the main primary set up a rotating m.m.f. and flux distribution across the equivalent airgap. A distributed two phase secondary winding is cut by the revolving flux distribution, delivering two phase voltages to a two phase load. The auxiliary primary is used to produce a perturbing rotating m.m.f. for creating small phase deviations in the main rotating m.m.f. from its nominal instantaneous position. Thus, the two phase output currents flowing through the TFT load are identical in waveform to the input currents, but may differ in amplitude depending on the transformer turns ratio. In addition, output currents may contain phase modulation impressed by signal currents in the auxiliary primary.

The equivalent circuit of a pole phase winding is illustrated in FIG. **8*b*** and comprises a capacitor C in parallel with an inductance L and its resistance $R_L$. The sawtooth signal is applied to the input terminals. Those skilled in the art will recognize that sawtooth currents are derived with relatively little distortion.

The effective sawtooth currents $i_A$ and $i_B$ flowing in the respective primaries are illustrated in FIG. **8*c***. The $i_A$ current and the $i_B$ current are 90° apart in time phase. The secondary signals are essentially the same with different scale factors. In the record operating mode, sawtooth currents have peak amplitudes of the order of an ampere in the stator. The combined action of these currents flowing in the $S_1$ stator produces a revolving m.m.f. distribution across the composite TFRH airgap having the following characteristics:

1. At any instant of time, the m.m.f. distribution across the equivalent airgap has a sawtooth shape in space, i.e., as a function of distance along the airgap, the m.m.f. intensity across the gap exhibits a sawtooth variation. The radial m.m.f. intensity goes through two complete sawtooth variations in $2\pi$ mechanical radians around the gap.

2. As a function of time, the m.m.f. distribution across the equivalent airgap rotates uniformly. Its rotational speed can be calculated from equation 1.3 with $P=4$ or $$n=s/2 \text{ rev./sec.}$$

Typically, for video recording, a sawtooth current frequency of 750 cycles/sec. is used so that the above equation gives $n=375$ rev./sec. for the rotational rate of the sawtooth m.m.f. distribution about the TFRH equivalent airgap.

While the preceding description used the terms of an annular core geometry it can be appreciated from the developed views of FIG. 6 and 13 that essentially the same performance also obtains for a linear core geometry.

Phase Modulating the TFRH Stator Currents.

The revolving m.m.f. distribution produced by a stator winding, described above, constitutes one of two traveling m.m.f. waves in the TFRH airgap from which a narrow m.m.f. magnetizing beam is synthesized. Stator $S_2$ produces the second wave. Signal (video) information is imparted to the m.m.f. beam by phase modulating the two constituent m.m.f. distributions, i.e., the stator driving currents. Polarity and amplitude of the constructed beam are a function of this impressed phase modulation. The dual primary TFT associated with each TFRH stator functions as the phase modulator for the currents driving that stator. Modulation action, which occurs in the TFT airgap, can be described either in terms of rotating m.m.f. vectors or traveling m.m.f. waves.

By exciting the auxiliary TFT primary with time quadrature currents, an auxiliary rotating m.m.f. is set up in the TFT airgap. If the auxiliary primaries are driven in quadrature from a high-frequency square wave voltage source, the corresponding currents, Aux $i_A$ and Aux $i_B$ are shown in FIg. **8*d***. The inductive transformer load (TFRH stator), reflected into the auxiliary primary, causes the auxiliary current waveform to be the integral of the applied waveform; consequently, this current is triangular as shown. A corresponding rotating m.m.f. wave is also triangular. Carrier voltage amplitude is adjusted so that the peak amplitude of $f_t$ is much smaller than the peak amplitude of $F_t$. The rotational frequency of $f_t$ about the TFT airgap is given by the equation $n=2\ s/P$. Nominally a carrier voltage in the range of 5 mc./sec. is used for video recording.

TRAVELING WAVE REPRESENTATION

FIG. 9*a* is a developed view of the airgap m.m.f. of TFT No. 1 (TFT No. 1 drives stator $S_1$). Main and auxiliary m.m.f. distribution (sawtooth and triangular) are shown. Two complete cycles are included, physically only one cycle exists in the airgap. The sawtooth distribution is shown at three consecutive instants of time. Traveling wave motion shifts it to the right a finite amount. At times $t_2$ and $t_3$ the nominal, undeviated positions are shown dashed. The high-velocity (high frequency) auxiliary m.m.f. wave also moves to the right and the resultant distribution is shown by a solid line. Adding the perturbing triangular wave to the main wave periodically advances and retards the instantaneous phase of the sawtooth wave about its nominal position.

Figure 9B:
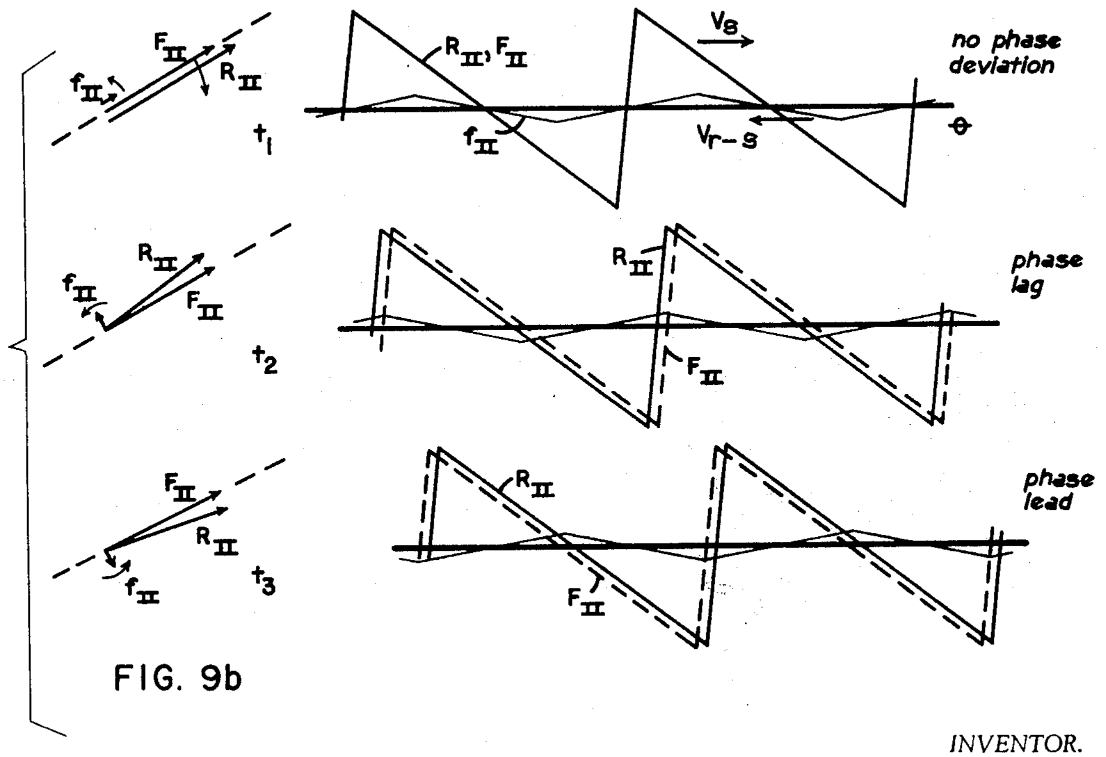

FIG. 9*b* is a similar drawing for the m.m.f. waves at the airgap of TFT No. 2 at the same three instants of time (TFT No. 2 drives stator $S_2$). The sawtooth distribution is the mirror image of the distribution in TFT No. 1 and the auxiliary m.m.f. wave travels to the left instead of the right. Phase deviations produced on the wave in TFT No. 2 are equal and opposite to those produced on the wave of TFT No. 1. The two sawtooth waves, although having mutually inverse polarities, are in time coincidence in their nominal, undeviated positions.

On the left of FIG. 9, the corresponding vector representation of the phase modulation process in both TFT's is illustrated.

Physically, addition of the auxiliary m.m.f. wave to the main sawtooth wave in the airgap affects the main wave in two ways. As a function of time, it:

1. Alters the shape of the main wave
2. Shifts the instantaneous axis (position) of the main wave.

If the peak amplitude of the auxiliary wave is small compared to that of the main wave, it has only a perturbing effect on the shape of the main wave. However, the maximum deviation of the main flux axis from its instantaneous nominal position is directly proportional to the peak amplitude of the auxiliary wave. Consequently, small phase deviations can be impressed on the sawtooth wave without significantly altering its form, by an auxiliary carrier wave. The resultant phase deviated air gap flux rotating in the TFT induces two phase secondary voltages which drive corresponding phase modulated currents in the load impedance (TFRH stator).

SYNTHESIS OF m.m.f. beam

FIG. 10 shows the two m.m.f. waves which act across the TFRH airgap and their sum, for five different instants of time. Since the TFRH is a four pole structure, two cycles of the m.m.f. wave appear in the airgap. Phase modulated currents from TFT No. 1 drive stator $S_I$ and produce the phase modulated traveling m.m.f. wave, $R_I$. Phase modulated currents from TFT No. 2 drive stator $S_{II}$ and produce the phase modulated traveling m.m.f. wave, $R_{II}$. Both waves travel in the same direction at an angular rate given by the equation $n=S/2$ mentioned before. FIG. 10 is drawn in a reference frame moving at this rate also, so that only relative motion, i.e., phase displacement, appears.

The center diagram shows m.m.f. waves $R_I$ and $R_{II}$ at time to when neither is displaced in phase from its nominal position. No net m.m.f. acts across the TFRH airgap, because the two waves are mirror images and cancel one another. As wave $R_I$ is advanced in phase and wave $R_{II}$ is retarded ($t_1$ and $t_2$) cancellation in the retrace region of each wave becomes imperfect and a resultant signal consisting of two positive narrow regions of m.m.f. appear. Each of these regions constitutes an m.m.f. beam. Beam amplitude is proportional to the relative phase displacement impressed on the constituent waves. In this figure, a linear retrace is shown. The actual cosinusoidal retrace makes the constructed beam amplitude approximately a sinusoidal function of the linear phase deviation impressed on waves $R_I$ and $R_{II}$ by the triangular m.m.f. wave in each TFT. A phase deviation corresponding to half the retrace interval produces maximum positive beam amplitude (at time $t_2$). This peak beam amplitude is equivalent to the peak-to-peak sawtooth current amplitude, $2I_o$ in the stator.

As wave $R_I$ is retarded in phase and wave $R_{II}$ is advanced in phase ($t_3$ and $t_4$), cancellation in the retrace region again becomes imperfect and two resultant negative narrow regions of m.m.f. appear in the airgap. For equivalent phase displacements they are mirror images of the positive beams produced at times $t_1$ and $t_2$.

Thus, the resultant m.m.f. acting across the TFRH airgap effectively becomes two narrow regions two pole pitches apart, when the phase modulated m.m.f. waves shown are simultaneously present. Amplitude and polarity of these regions are proportional to phase modulation contained in the two constituent waves. Since the sawtooth m.m.f. waves are also traveling waves, the beams simultaneously sweep along the airgap.

While the equation $n=s/2$ gives the angular rate of m.m.f. rotation, the tangential velocity, $v$, with which the beams move along the gap depends on the TFRH dimensions and is related to the linear pole span, L by the relation $V=2Ls$ in./sec. For a 2-inch wide tape and 750 cycle sawtooth driving current, this gives a linear field velocity of 1,500 in./sec.

FIG. 10 also shows that when the distributions are phase deviated, cancellation in the trace portions of waves $R_I$ and $R_{II}$ is not complete, and a residue remains. The polarity of the residual m.m.f. is always conjugate to that of the instantaneous m.m.f. beam. In terms of an equivalent current, $i_o$, the residue amplitude is proportional to the sawtooth phase deviation, with a maximum amplitude given by $$i_o=I_o ts$$

where $I_o$= peak amplitude of the sawtooth current exciting the stator $t$ = retrace time of the sawtooth exciting current $s$ = sawtooth current repetition frequency. For $t$=0.1 microsecond and $s$=750 cycles/sec. $ts \veebar 1\times10^{-4}$, or the maximum decremental m.m.f. amplitude, $d$ (FIG. 10), is approximately 80*db*. below the peak beam m.m.f. amplitude. The effective maximum width, δ, of the beam in space is $tv$. Using the above values for these quantities, δ, is equivalent to a mechanical gap of 0.15 mils in a conventional recording head.

CARRIER WAVE FREQUENCY

To maintain at all times the symmetrical phase displacement exhibited by the constituent sawtooth distributions in FIG. 10 requires a fixed frequency relationship between sawtooth drive and triangular carrier currents. FIG. 9 illustrates how the need for a relationship between these two frequencies arises. Phase modulation occurs by virtue of the passage of a high-velocity, small amplitude m.m.f. wave past a slow moving main wave. As shown in FIG. 9, main and auxiliary carrier waves move in the same direction in TFT No. 1 and in opposite directions in TFT No. 2. The actual phase deviation frequency impressed on the main wave corresponds to the relative velocity between the two waves, i.e., the carrier wave frequency as seen by the moving main wave. Consequently, to phase deviate the main m.m.f. wave at frequency $r$ in each TFT requires two phase triangular currents having the following frequencies:

TFT No. 1 (both waves move in same direction) $r+s$

TFT No. 2 (waves move in opposite direction) $r-s$ where $s$ is the frequency of the sawtooth current in the TFT main primaries ($s$=750 cycles/sec). Carrier currents with these frequencies produce traveling m.m.f. waves of the correct frequency to appear as waves of frequency $r$ to the main sawtooth m.m.f. wave in each TFT.

REMNANT MAGNETIZATION AND PLAYBACK

Figures 11A, 11B:
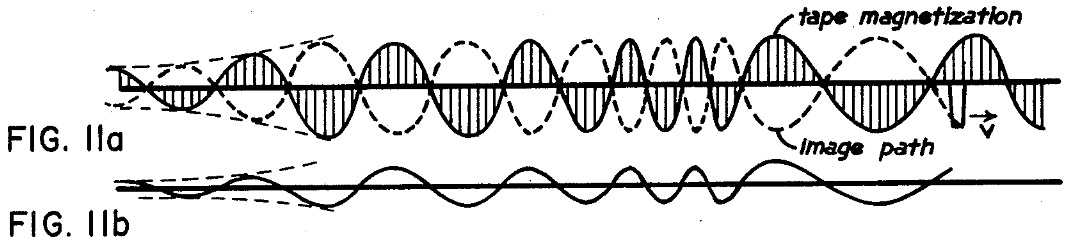

Information (video) is recorded as frequency modulation of a carrier wave. FIGS. 11a and 11b illustrate the remnant flux wave an FM carrier produces in the tape. Wavelength recorded in the tape depends directly on the velocity $v$ with which the beam moves. Modulating the carrier frequency, $r$, alters the rate of phase deviation applied to the m.m.f. sawtooths and in turn causes the beam to correspondingly change the frequency at which it alternates. Since the beam moves at constant speed along a track, the recorded wavelength follows the carrier frequency variations. On the right of FIG. 11a, the recorded wavelength corresponding to a carrier frequency swing above and below the nominal value $r$, is illustrated. For video recording, $r$=4.5 mc. is a typical carrier frequency. Also in video recording only the lower sideband is utilized so that only recorded wavelengths longer than the carrier wavelength are important.

A magnetization pattern previously recorded along a transverse track is detected or "read" by an m.m.f. sense beam. Sense and write beams differ only in amplitude. A sense beam is formed when sawtooth currents exciting the TFRH stators are reduced in amplitude relative to their record values. Amplitude is lowered until peak beam flux approximately equals the peak flux retained in the tape. An oxide coating with high coercivity prevents track demagnetization by the sense m.m.f. Remnant magnetization is read by moving the beam, in registry, along a track. FIG. 11a illustrates how beam polarity (frequency) is varied to constrain it to follow the image of the remnant flux wave. A difference flux, i.e., difference between the remnant and image flux waves, is shown in FIG. 11b. A playback winding, located in slots under the aperture, interlinks the difference fluxes. The voltage induced in this winding is the input signal to a feedback loop that controls beam frequency, constraining it to follow the image flux.

Figure 11C:
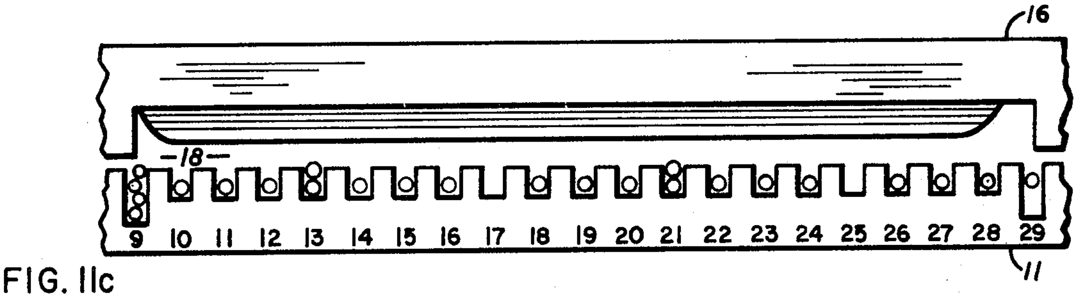
Figure 11D:
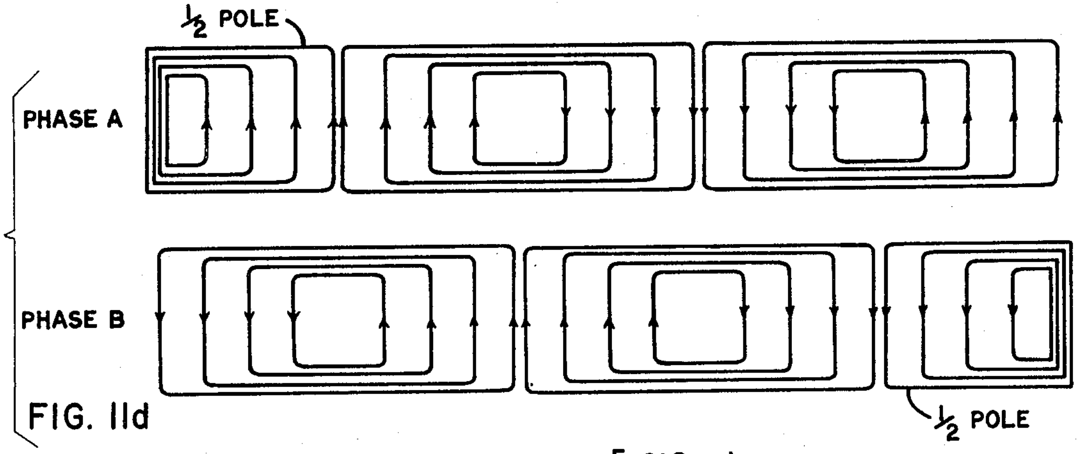

FIG. 11c is a developed cross section view of the TFRH core at the aperture. Tooth cap detail is omitted. Coil sides of phase A of the playback winding are shown occupying slots 9 through 29 beneath the aperture. FIG. 11d is a developed plan view of the concentric, two phase playback winding. The number of wire turns in consecutive coils is sinusoidally distributed over a pole. Interconnections between individual coils within a pole are concentric. Arrowheads indicate winding direction, which alternates between adjacent poles. Terminal slots 9 and 29 are deepened to accommodate the four coil sides associated with the end of each ½ pole.

Figure 11E:
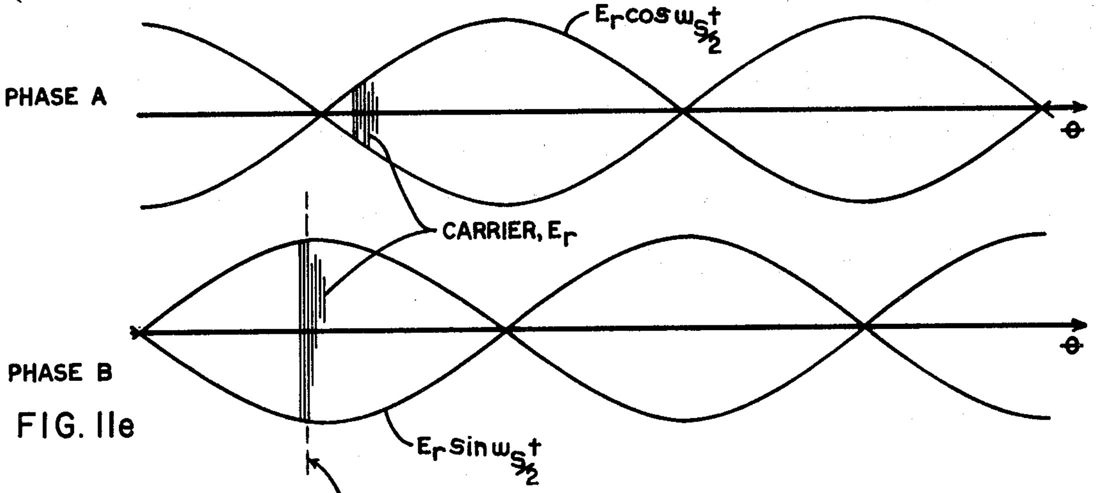

FIG. 11e shows the envelope of the voltage induced in each phase of the playback winding by an alternating read beam flux moving along the aperture, tracking the remnant flux wave. The A phase envelope varies as cos $\omega_{s/2}t$ and the B phase envelope as sin $\omega_{s/2}t \cdot \omega_{s/2}t$ is the space angle of the beam in the aperture, measured from one end of the aperture, and $\omega_{s/2}$ is the angular rotational rate of the beam in the airgap. Sinusoidal distribution of coil turns over a pole makes the envelope sinusoidal also to the same approximation that the winding is sinusoidally distributed. A maximum in the envelope occurs when the beam flux passes through a pole axis at the geometric center of a pole group. An envelope zero occurs at the ends of a pole.

Figure 11F:
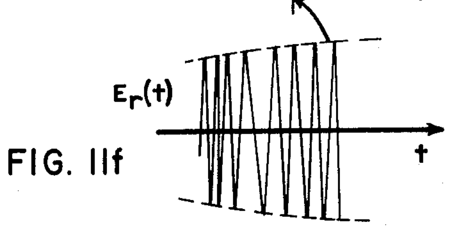

FIG. 11f shows the output voltage of one phase of the playback winding as a function of time. In addition to the above envelope modulation, the induced voltage is frequency modulated in accord with FM in the remnant wave which the beam tracks. Instantaneous net flux linking the playback winding is the difference between a static remnant flux wave and the local moving beam flux imposed on it. FIG. 11b shows this difference as a function of distance along the flux wave. By virtue of a constant beam velocity, it is also the difference flux as a function of time and induces both phase voltages. One of these is shown in FIG. 11f.

TRAVELING FIELD-RECORDING SYSTEM

FIG. 12 is a functional block diagram of a complete rotating field recording system incorporating the devices and methods previously disclosed. The major elements enumerated here have been described in part in connection with FIG. 3.

FIG. 12 shows a traveling field recording head 100, traveling field transformers I and II, sawtooth current generator means 300, frequency modulator 500, frequency modulator and playback circuitry 800 and tape position synchronizer 600.

*a.* Traveling Field Devices

TFRH stators $S_I$ and $S_{II}$ are driven from the two phase secondaries of TFT No. 1 and No. 2, respectively. For legibility interconnections among the four poles in a recording head phase group are omitted and only connections between each TFT secondary and recording head stator are shown. Corresponding main primaries of each TFT are energized from the in-phase and quadrature current drivers, respectively. Primary winding polarity is selected to establish rotating m.m.f. distribution $F_I$ in TFT No. 1 and $F_{II}$ in TFT No. 2. Rotational direction is the same in each TFT (e.g., clockwise). TFT secondary currents flowing through stators $S_I$ and $S_{II}$ reestablish the rotating distributions across the TFRH airgap The rotational rate of these distributions in the TFRH airgap is $\omega_{s/2}=2\pi s/2$ rad./sec. ($s$ is the recursion frequency of the sawtooth current). In the absence of phase modulation on the distributions, $R_I$ waves and $R_{II}$ cancel one another and no net m.m.f. acts across the TFRH airgap.

TFRH playback windings $P_A$ and $P_B$ are also shown minus interconnections among individual poles.

*b.* Sawtooth Current Generator

Grid voltages applied to the in-phase and quadrature current drivers 306 and 314 are obtained from two sawtooth voltage generators, consisting of sweep generators 304 and 312 gated by blocking oscillators 302 and 310 respectively. A multivibrator oscillator 900 directly triggers inphase sawtooth generator 302. A trigger is obtained for the quadrature generator from phantastron delay circuit 308 which provides a trigger delayed by a quarter period. The delayed trigger is in time quadrature with the oscillator wave and actuates the quadrature generator. Record or playback levels for the sawtooth grid voltages are determined by switch SW 2 which selects either a high- or low-amplitude sweep voltage. Corresponding levels produced in the sawtooth currents result in m.m.f. beam intensities suitable for recording or playback, respectively. Sawtooth grid drive voltages occur at the oscillator frequency, $s$=720 cycles.

*c.* Frequency Modulator

Modulator 500 generates an FM carrier voltage of instantaneous frequency, $r$, in response to an input signal voltage. In record operation an external signal constitutes the input modulating voltage. In playback operation, the output signal from the demodulator constitutes the input modulating voltage. Final carrier voltages with the required frequencies, $r+s$ and $r-s$ are obtained by amplitude modulating the carrier of instantaneous frequency $r$, with sinusoidal voltages of frequency, $s$. This process produces a pair of sinusoidal voltages which keep the required relation between frequencies $r$ and $s$ as the carrier is deviated over its entire frequency range by the input signal. Each of these sinusoidal voltages is converted into a two phase square wave. The inphase wave is obtained by directly amplifying and clipping the carrier wave. A quadrature wave is obtained by first shifting the carrier in phase by 90° and then amplifying and clipping. The range of frequencies covered by $r$ necessitates a wide band phase shift network. Auxiliary primaries in TFT No. 1 establish the high-frequency m.m.f. distribution, ($r+s$) so that it rotates in the same direction as the main m.m.f. wave. Auxiliary primaries in TFT No. 2 establish the lower frequency m.m.f. distribution ($r-s$) so that it rotates in the opposite direction to the main m.m.f. wave. These perturbing distributions phase deviate the main sawtooth distributions in each TFT at the instantaneous carrier rate, $r$.

*d.* Frequency Demodulator

Playback winding phases A and B are connected to preamplifiers 950 ($K_A$) and 952 ($K_B$) respectively. The amplifiers have a squared response making their output proportional to the square of the input voltage. In playback operation, the output voltages of both amplifiers are summed in adder 960 to obtain the complete playback signal. In summing dependence on the space angle $\omega_{s/2}t$, present in the individual phase voltages, is lost because of the trigonometric identity $\sin^2\omega_{s/2}t+\cos^2\omega_{s/2}t=1$. Output voltage from the adder is proportional to the instantaneous difference between the remnant flux wave in the tape and the image flux wave traced over it by the feedback controlled sense beam. Thus, the effective playback voltage obtained from the playback winding is a frequency modulated carrier wave of approximately constant amplitude. Functional blocks shown in demodulator 800 in FIG. 12 remove the FM from the carrier. Demodulator output voltage constitutes both the recovered signal 700 (video) and also the input signal to the frequency modulator which generates the control frequencies that constrain the beam to track the image flux wave.

*e.* Tape Position Synchronizer

Reproducing the remnant flux wave in a transverse track requires registration between the track and sense flux moving along it. Synchronization needed between longitudinal tape velocity and transverse scanning frequency is obtained from a reference index recorded in a longitudinal margin of the tape during record operation. In playback operation, the recorded reference regulates longitudinal tape velocity through tape position synchronizer 600.

Record Operation

The system is placed in the record operating mode when switches SW 1 through SW 4 are set in "record" position. Switches SW 1 connects the grid of reactance tube 502 in frequency modulator 500 with the external input signal 400 to be recorded. In response to the input signal, the reactance tube deviates the nominal carrier frequency of oscillator 504 over a range of frequencies. For example, a nominal carrier frequency of 5 mc. may be swung down to 4.3 mc. and up to 6.8 mc. by a standard monochrome video input signal, for a total deviation of 2.5 mc. Oscillator 504 output voltage is an FM sine wave of instantaneous frequency, *r*.

The phasing method of single sideband generation constitutes a preferred method for obtaining the two required frequencies, $r\pm s$, from two sinusoidal voltages of frequencies $r$ and $s$. The fundamental concept involved in generation of a single sideband signal by the phase shift method is centered about two separate, simultaneous, amplitude modulation processes and subsequent combination of the modulation products. A simplified representation of the practical embodiment of the principle is shown in FIG. 12. Inputs to modulator 506 (No. 2) are the carrier signal of frequency, *r*, and a sinusoidal wave of frequency $s$ from locked oscillator 982. Modulator 514 (No. 1) has for its input, waves identical with those applied to the first modulator, but 90° out of phase with them, i.e., the sinusoidal wave of frequency $s$ from locked oscillator 980 is locked to the quadrature reference signal from generator 300. A wideband network is required to phase shift the frequency modulated signal obtained from the carrier oscillator. Modulator No. 1 produces a double sideband, suppressed carrier output of arbitrary phase. The output of modulator No. 2 contains sideband components identical to those from modulator No. 1 except of such phase that addition of both modulator outputs results in reinforcement of one set of sidebands and cancellation of the other. Subtracting both modulator outputs produces reinforcement and cancellation of the opposite pair. Thus, in separate output circuits, carrier voltages of frequency $r+s$ and $r-s$ are individually available. As the FM oscillator changes frequency, both output voltages change frequency also, continually maintaining one voltage higher in frequency than $r$ by $s$; and the other, lower in frequency than $r$ by $s$. Each of these waves is converted into a two phase square wave voltage by phase shift means 510, 511 and amplifier clippers 350, 352, and 360, 362 respectively, as shown in FIG. 12.

Using the phasing method of single sideband generation for obtaining the frequencies $r\pm s$, as opposed to the filtering method, has two advantages: the technique permits use of a carrier of varying frequency, and no sharp cutoff filters are required. Ordinarily when the phasing method of SSB generation is employed for radio modulation, the high-frequency carrier remains constant in frequency, while the low-frequency modulating signal (audio) contains frequency components from 200 to 20,000 cycles. Thus, a wide band, 90° phase shift network is required in the low-frequency input to one modulator suitable for a frequency range of about 100. In the present invention, the low-frequency signal to the SSB modulator is a constant frequency of 720 cycles, while the carrier contains a band of frequencies. Consequently, a wide band phase shift network 508 is required instead, in the quadrature carrier input. To accommodate a video recording signal, the network must cover a frequency range of approximately 10. The phase shift method of SSB generation is well known as described in the following references:

1. D.E. Norgaard, The Phase Shift Method of "Single-Sideband Signal Generation:," Proc. IRE, 44, 1718 (1956).
2. E.W. Pappenfus, W.B. Bruene, E.O. Schoenike, "Single Sideband Principles and Circuits," McGraw-Hill 1964 (Sec. 4–2).

In each TFT, a perturbing m.m.f. wave produced by the auxiliary square wave excitation from the frequency modulator, phase deviates the sawtooth m.m.f. distributions at the FM carrier rate, *r*. Two traveling m.m.f. beams, formed across the TFRH airgap from the sawtooth waves, also alternate at the FM rate *r*, perpendicularly magnetizing FM tracks across the width of the recording tape as they move.

Playback Operation

The system is placed in the playback operating mode when switches SW 1 through SW 4 are set in playback position (FIG. 12). SW 1 connects the grid of the reactance tube 502 in the frequency modulator with the demodulator output, 700 forming an external feedback loop around the TFRH.

Consider that, initially, a sense beam moves along a track flux wave in registration with it, while sinusoidally alternating at frequency, $r_1$. The flux wave in the track is also sinusoidal and corresponds to a beam frequency of $r_2$. Voltage induced in each phase of the playback winding is produced by the changing difference between the alternating flux in the traveling beam and the local remnant flux in the track, momentarily coincident with it, i.e., by the time rate of change net flux interlinking the playback winding. Following amplification in preamplifiers $K_A$ and $K_B$, summation of phase voltages A and B, yields a resultant playback voltage, $E^2(t)$, independent of the playback winding geometry. This voltage is the input signal to the demodulator and as a function of time, $t$ can be expressed as $E_r(t)=E_o \sin 2\pi\frac{1}{2}(r_1-r_2)t \sin 2\pi[r_1+\frac{1}{2}(r_1-r_2)]t$ where $E_o$ is a constant of proportionality. The wave diagrams in FIG. 12 show $E_r$ along with the track and beam flux waves which produce it. $E_r$ has the following characteristics:

1. It is amplitude modulated at the difference frequency $r_1-r_2$ (first factor in Equation)
2. It is also angle (frequency) modulated at the difference frequency, $r_1-r_2$ (second factor in Equation)

The amplitude variation is the well-known phenomenon of beats and the difference frequency is called the beat frequency. Using FM terminology, $\frac{1}{2}(r_1-r_2)$ is the frequency deviation for the carrier (track) frequency, $r_2$, and is a measure in both magnitude and sign of the difference between remnant wave and beam wave frequencies. It constitutes an FM error signal between beam frequency $r_1$, and flux wave frequency $r_2$, the frequency the sense beam should assume.

In the demodulator, playback voltage is transmitted through a low-pass filter 802 which eliminates the upper sideband components of frequencies recorded in the tape. Next, an amplifier-limiter 804 converts the voltage to an FM square wave, removing all amplitude variations from the signal. A conventional FM detector 806 (Foster Seely discriminator), followed by an AM envelope detector 808, demodulate the playback voltage. After transmission through a low-pass filter 810, linearity corrector and video amplifier 812, the recovered FM signal appears at the demodulator output. It is both the playback output signal and input to the frequency modulator which controls the sense beam frequency.

By completing the external feedback loop degeneratively, an error voltage corresponding to the frequency deviation $\frac{1}{2}(r_1-r_2)$, is applied to the reactance tube with a polarity that results in a change in oscillator frequency causing $r_1$ to approach $r_2$. When $r_1=r_2$, frequency deviation becomes zero also, no additional frequency corrections are needed and the beam flux has "acquired" the remnant flux wave as shown in FIG. 11*a*. Since the track wave ranges over a band of frequencies corresponding to the original FM impressed on the carrier, the correction voltages produced by the frequency difference between track and beam waves (obtained from the effective frequency deviation/applied to the reactance tube) continuously changes to maintain the condition, $r_1=r_2$. Feedback thus acts to drive the playback voltage, $E^2(t)$ to a null as the beam is constrained to track the remnant wave image.

The playback output voltage is the desired reproduction of the recorded signal to the extent that the error component in the demodulated signal, corresponding to the FM term $\frac{1}{2}(r_1-r_2)$ is nulled.

As a tracking beam approaches the end of a remnant flux wave in a transverse track a transition must be made from the terminating track to the continuation of the wave on the next track. With the feedback tracking system described above, an automatic or self-acting transition between adjacent tracks is possible. The TFRH shown in FIG. 2 and FIG. 14 produces two m.m.f. beams along the magnetic core. Separation between both beams (equal to two pole pitches) and tape width are selected so that before one beam leaves the aperture, the second one enters it at the other end to begin the next track. By this arrangement overlapping or redundant recording occurs in short regions at the end of each track and the start of the succeeding track. In playback operation these regions of overlapping recording are used, in conjunction with the geometry of the crown edges at the ends of the aperture, to obtain a continuous playback signal from the discrete transverse tracks.

As a tracking beam approaches the end of a transverse track, the voltage it induces in the playback winding begins to diminish for two reasons:

1. The amplitude of the remnant flux wave diminishes as the end of a track is approached (see FIG. 11*a*).

2. The intensity in the scanning beam flux also diminishes because of the greater separation between the edges of the aperture near the ends (see FIG. 11*c*). Conversely, for the second sense beam just starting a new scan on the next track conditions are the reverse of those for the first beam. Flux intensity in the second beam increases as it enters the aperture (separation between crown edges diminishes upon entering the aperture) and also the remnant wave intensity increase upon first entering a track (FIG. 11*c*).

When just one beam is in the aperture, it induces the entire playback voltage. As a beam approaches the end of the aperture, the second one enters at the other end (on the next track) and contributes a small percentage of the total induced voltage. The percentage is small for the reasons listed above. As time passes, the receding beam contributes progressively smaller percentages of the induced voltage while the advancing beam increases its percentage contribution. Finally, the receding beam leaves the old track and the aperture. The advancing beam on the new track, now within the fully developed part of the aperture, then contributes the entire induced voltage. In this manner a smooth and automatic transition is made in recovering the recorded signal when passing between successive transverse tracks. In the case of video recording, if the transition takes place in 0.01 microseconds or less, it is not discernable in the TV image.

Synchronizing Scan Frequency and Tape Velocity

Registration between transverse recorded tracks and successive read scans of the flux beam is obtained by synchronizing the longitudinal tape velocity with the transverse scanning frequency. Recording tape is drawn through the aperture at velocity, V, (approximately 15 in./sec.) by the tape drive capstan, which is driven through a synchronous motor. Tape speed is controlled by regulating the speed of the synchronous capstan drive motor. FIG. 12 contains a block diagram of a system for synchronizing tape position by controlling the frequency of the voltage applied to the synchronous motor.

In record operation switches SW 3 and SW 4 are set in "record" position. A 60 cycle voltage for the synchronous drive motor 610 is obtained from the 720 cycle oscillator 900 by dividing the oscillator frequency by 12 in divider 606 and amplifying the 60-cycle voltage in power amplifier 608. A 720 cycle signal is also recorded on one longitudinal tape margin by a control track recording head 622 positioned to engage this track. The control track head is a conventional recording head and records by longitudinal magnetization. It is driven by a control track recording amplifier 620. A notch in the crown at one end of the aperture (FIG. 11*c*) leaves a narrow, unmagnetized margin for the control track. It establishes a relative relationship between the tape and location of transverse tracks in the tape (the oscillator, through the sawtooth current generator, times the transverse tracks).

In playback operation switches SW 3 and SW 4 are set in playback position. The recorded 720 cycle control track signal is reproduced from the tape, amplified by control track playback amplifier 618, transmitted through an adjustable phase delay network 616 and finally converted into a square wave in an amplifier-clipper 614. In a phase comparitor 612, the reproduced 720 cycle square wave is compared in phase with the oscillator square wave. As long as they are 90° out of phase, no error voltage is generated. However, when the phase angle of the waves from the control track and oscillator differ from 90° (which happens when the capstan rotation is not synchronized with the TFRH stator m.m.f. rotation), a resultant ±DC voltage is created. This voltage controls operation of the reactance tube 602 which is one of the frequency determining elements of a 60-cycle bridge oscillator circuit 604. The bridge oscillator, through the power amplifier, drives the capstan motor. Thus, any phase error is translated into a control voltage which varies the bridge oscillator frequency and corrects the capstan motor speed. An adjustable phase delay following the control track playback amplifier acts as a tracking adjustment permitting initial alignment of the tracks and transverse beam scans. Control track synchronization is used in current electromechanical video recording apparatus and the system illustrated in FIG. 12 represents a commonly used arrangement.

OTHER MODULATION TECHNIQUES

In conventional PM, the carrier or wave on which the phase modulation is impressed is much higher in frequency, i.e., its period is much shorter, than that of the modulating or information signal. In phase modulating the carrier, information is impressed by shifting the position of the carrier zeros.

With convention PM the carrier period, $T_c$, must be small compared to that of the modulating signal $T_m$, i.e. $T_c<<T_m$. While the original modulating signal is continuous, when impressed on the carrier, it becomes discrete, i.e., it is transmitted in a discrete number of points corresponding, in one cycle, to the number of carrier zeros occurring in the time interval, $T_m$. Consequently in conventional PM for the modulating signal to be transmittible by a carrier, its period $T_m$ must be long compared to the carrier period, $T_c$. Thus, it can be "sampled" many times in its period enabling reproduction with good fidelity upon demodulation from the carrier. This requirement stems from the fact that as ordinarily accomplished PM is carried out in time, where the zeros of the carrier, the only relevant quantity it possesses for that process, are available but twice each period of the carrier, or $2/T_c$ per second.

In my recording system, each of two traveling m.m.f. waves in the TFRH must be modulated in phase a small amount by a high-frequency "carrier" wave; this wave containing the information to be recorded on the tape in the form of frequency modulation. PM is only necessary to create or synthesize the m.m.f. beam from the two constituent traveling sawtooth waves and is not essentially part of the system modulation theory. The fundamental period of the sawtooth current that produces the prototype (sawtooth) m.m.f. distributions (the carrier wave) is $T_c=1/s=1/720 \triangleq 1{,}400\mu$sec., while the wave which must phase modulate it has a center frequency of 5 mc./sec. or $T_m=1/r=1/5\times10^6=0.2\mu$sec. These conditions are just the reverse of those described above for conventional PM since now $T_c>>T_m$. PM is made possible under these conditions by carrying out the process in space instead of time (in time, the number of available zeros in the sawtooth current wave, 2×720=1,440 per sec. is much too small to accommodate the $5\times10^6$ cycles per sec. in the modulating signal). By transforming the sawtooth current from a function of time into a function of space in the form of traveling m.m.f. wave with a sawtooth field distribution, the zeros of the sawtooth function become continuously available. In this special form, the zeros are continuously available since the distribution always exists, only its position in space changes cyclically with time, only now with sawtooth excitation, the field intensity across the center plane also exhibits a sawtooth variation. A TFT performs the translation of a sawtooth current (two phase) from a function of time into a function of space. The currents produce a traveling m.m.f. wave which moves along the TFT center plane and maintains a sawtooth distribution of field intensity across the center plane. It propogates along the plane completing 720 revolutions per sec.

As a function of time, the flux distribution across the equivalent air gap rotates uniformly, completing one revolution about the gap in the time of one period of the exciting current, i.e., $$n=2s/P \text{ rev./sec.} \quad 1.3$$

where $n$ is the rotational rate of the radial flux distribution around the TFT equivalent airgap.

$s$ is the frequency of the current driving the TFT LOAD (cycles/sec.)

$P$ is the number of poles in one phase winding of the primary ($P=2$).

A complete wavelength of the distribution appears about the $2\pi$radians of the center plane.

Pm is impressed on the main sawtooth wave by propagating a second, perturbing m.m.f. wave along the center plane. The rotational speed of this auxiliary wave is also determined by the above Equation. The resultant m.m.f. acting across the plane is then the instantaneous sum of the main and auxiliary (signal) m.m.f. waves. A perturbing auxiliary distribution has negligible effect on the shape of the sawtooth distribution in the main wave but directly affects the instantaneous phase angle of the main wave. Currents induced in a two phase secondary lined by the center plane flux and hence correspond to PM sawtooth currents in which the modulation frequency is very high compared to the fundamental sawtooth frequency. It is believed that only PM in space can accomplish this and this technique imposes no limitation on the relative frequencies of the carrier and modulating waves. A signal frequency below that of the carrier is also practicable.

If the required phase displacements of the sawtooth wave were large, the amplitude of the auxiliary traveling wave in the TFT would have to be correspondingly large and the resultant displaced m.m.f. distribution would not retain the sawtooth shape. Because the perturbing signal m.m.f. wave in the TFT need only be small, the sawtooth form is not materially affected.

MAGNETOMOTIVE FORE OF A CONCENTRIC WINDING

When establishing a rotating m.m.f., in a TFRH, each stator is formed from two concentrically wound pole phase groups, positioned so they are mutually orthogonal. A concentric winding is a distributed winding, i.e., a winding spread over a number of slots around the periphery of the toroidal core. A concentrically wound pole phase group produces an m.m.f. which acts across the equivalent air gap; the resultant radial m.m.f. intensity varies sinusoidally around the airgap. Other winding types beside concentric can be used to produce a sinusoidal m.m.f., e.g., the double-layer lap winding described for the TFT. A concentric winding is preferred, however, because it exhibits a high degree of harmonic suppression.

Figure 14A:
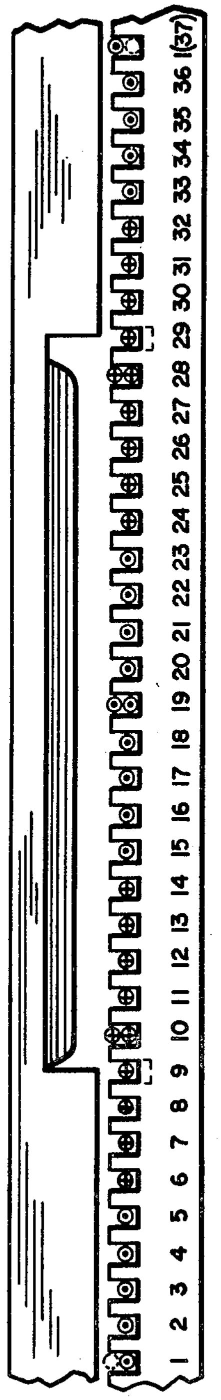
Figure 14B:
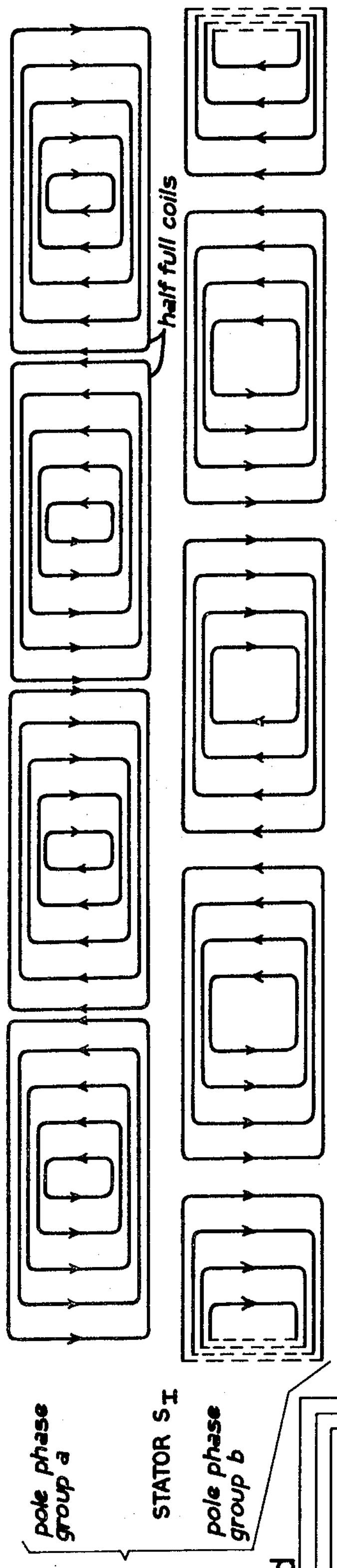

FIGS. 14*a* and *b* show two developed (laid out) views of pole phase group *a*. FIG. 14*b*is a plain view of pole phase group a, while part *a* shows this winding in cross section. Part *b* shows the end turns of individual coils and part *d* indicates interconnections between individual coils and between adjacent poles (one concentric group produces a pole). Coils are connected to form a spiral current path accounting for the term "-concentric" used to describe the winding. The Figure illustrates that the pitch or slot span of different coils varies depending on the relative position a particular coil occupies in one concentric group. In addition, the number of turns of wire in the 1st, 2nd, 3rd, 4th, and 5th coil (see part *d*) in a concentric group sinusoidally decreases. This variation has not been reflected in the cross sectional coil areas shown in FIG. 14, where all cross sections appear the same. Arrows on the coils in FIG. 14*b* indicate direction of current flow through the winding and conform with the current belt directions of FIG. 14*a*. Pole phase group a is shown wound in a style which causes the ends of exterior coils in adjacent poles to overlap at the transition between poles. The exterior coils are made half full so that a full coil results in the common slot shared at overlap. Each pole is allocated 9 slots and wound from five coils.

Figure 14C:
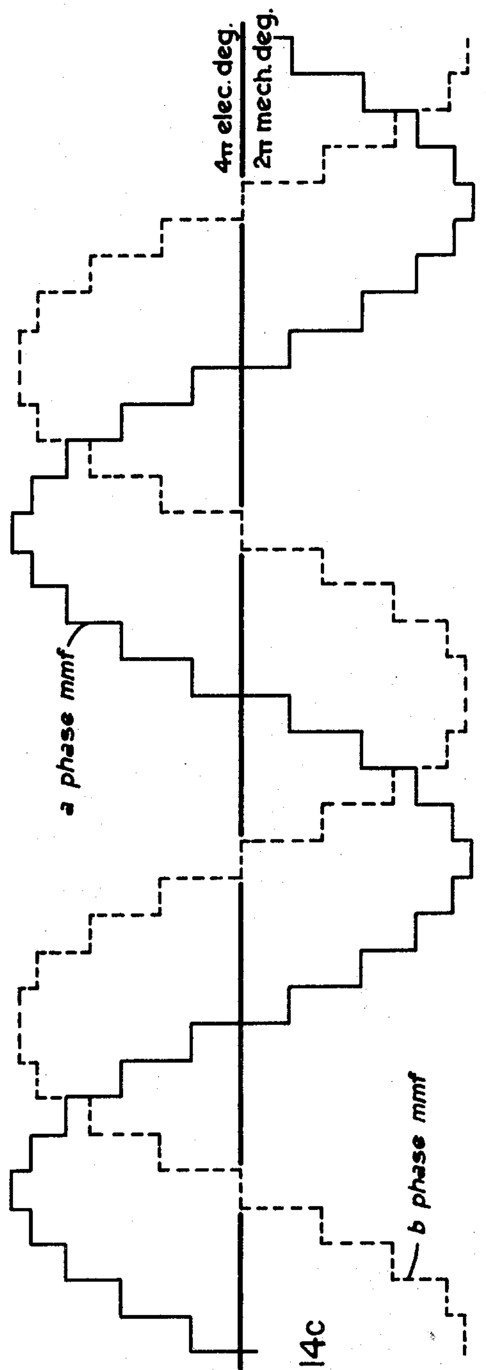
Figure 14D:
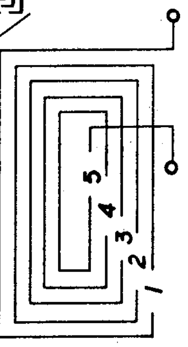

FIG. 14*c* shows the magnetomotive force produced by a current flowing in pole phase group *a*. The distribution is a stepped sinusoid in which the height of each step decreases as the wave peaks are approached due to the sinusoidally decreasing number of wire turns on the interior coils. Because it is produced by a four-pole winding, the distribution goes through two complete cycles ($4\pi$ electrical degrees) in 2 $\pi$ mechanical degrees. This m.m.f. distribution can be derived from the cross-sectional view of the complete winding. If direct current is passed through pole phase group a, FIG. 14*c* depicts the distribution of the radially directed m.m.f. as a function of angle. It does not change with time, If an alternating current is passed through the winding, however, the distribution will vary in time in accord with the time variation of the exciting current.

TIME SYNTHESIZED TRANSVERSE TAPE SCANNING

In a magnetic tape recording system with transverse tape scanning a narrow region of m.m.f. must move across the tape width at uniform velocity while alternating in polarity in response to the signal to be recorded.

Viewing the narrow region of modulated magnetomotive force which must pass across the tape as a traveling m.m.f. wave elegantly establishes the two possible ways a transverse scanning system can be synthesized. A traveling wave is a function of both distance and time, i.e., $F(x,t)$. Either $x$ or $t$ can be considered the independent variable while the other remains fixed.

When $x$ is regarded as the independent variable the width, $\delta$ of the magnetizing field and the separation, 2L between successive magnetifying fields become parameters defined in space. Consequently, a recording system synthesized, regarding space as the independent variable, results in an electromechanical system because $\delta$, and 2L are mechanically defined. A field producing means of width continuously exists while the amplitude of the field it produces varies in response to information bearing currents.

When $t$ is regarded as the independent variable the continuous existence of a field producing means of width $\delta$ is not required. Instead a means is provided which permits the instantaneous creation of a narrow m.m.f. of width $\delta$ and the correct polarity on demand from information bearing signals. Two traveling sawtooth shaped field distributions provide the means for instantaneously creating the required narrow magnetic field as shown in FIG. 10, while not continuously manifesting as such, a narrow field producing means. The currents which produce the traveling sawtooth fields are functions of time. The retrace interval and sawtooth period are both time parameters determined by electrical constants. Consequently a magnetic recording system employing a TFRH can be considered a recording system with transverse scan synthesized in time, while existing electromechanical recording systems with transverse scan are synthesized in space.

A PLANAR POWER DISTRIBUTION SYSTEM

A TFT with mesh secondary connection 20 is shown in FIG. 5*a*. In the present application to a planar power distribution system (PPDS) a similar TFT is used as a power source for supplying energy to toy or model vehicles which operate from conductors having two dimensional contact surfaces. The two-dimensional conductors also constitute the supporting surface on which the vehicles move, as well as functioning as conductors. Vehicles are not confined to a fixed path on the surface, but can move over it without restraint. Prior art attempts to construct such planar power distributions systems, in which both conductors of the distribution system lie in essentially the same plane, are illustrated by the following U.S. Pat. Nos. 1,779,052, H. Souplis; 2,768,697, A. Shotwell; and 2,832,427, A. Shotwell. These inventions have the disadvantage that a vehicle operating on the surface must be provided with complex and bulky onboard equipment to enable it to obtain power from the surface. The size and cost of this on-board apparatus, as well as the mechanical complexity of the operating surface itself, limits both the performance and fields of application of such systems.

The present PPDS is a simplified distribution system and in particular has the following advantages: An autotransformer is the only auxiliary apparatus required in a vehicle in order to make power from the surface available on-board the vehicle. With wheeled vehicles, current collectors for engaging the surface conductors can be embedded in the tires so that a vehicle retains a realistic appearance, with no unnatural appendages visible. The conducting surface approximates a continuous, mechanically smooth conductor, and it can easily be formed.

A TFT POWER SOURCE

To facilitate an understanding of my simplified planar power distribution system and the method of exciting it from a TFT, reference is made to FIG. 15. FIG. 15*a* shows a section of the operating surface in cross section.

Conductors 2002 comprising the operating surface of the PPDS consist of long, narrow, closely spaced strips. Aluminum foil laminated paper is a suitable material from which to form the individual conducting elements. It consists of aluminum foil cemented to paper backing 2004. The paper side of the laminate is cemented to base 2000 for mechanical support, and the exposed foil-coated side slit into a series of noncontiguous strips. Strips approximately one-fourth inch wide are suitable for vehicles with a wheel base 4 inches long and 2 inches wide. Slits 2006 are made deep enough to break through the foil layer and, as a safety factor, to also score the top surface of support base 2000. Each strip becomes one of the conducting elements of the surface. For a foil 5 mils thick, a strip has a cross-sectional area equivalent to that of No. 18 wire. Thus, a strip and, consequently, the entire surface can be made with appreciable current carrying capacity. The separation between individual strips is typically about 10 mils. Strip separation is sufficiently small so that the gap between two strips is bridged by the current collector mounted in a tire face as the tire rolls across the gap; i.e., two adjacent strips are shorted together when a current collector, or tire, passes from one strip to the next. Because the gap between adjacent conductors is small compared to the strip width 4 percent of the strip width for the dimensions used above, to a first approximation, the surface can be considered a continuous conductor capable of supporting a potential gradient along the surface in a direction perpendicular to the strips.

Figure 15A:
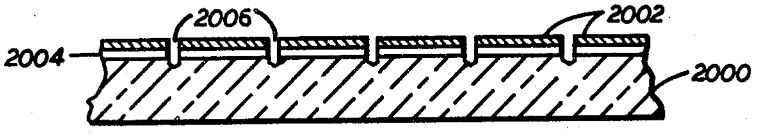
Figure 15B:
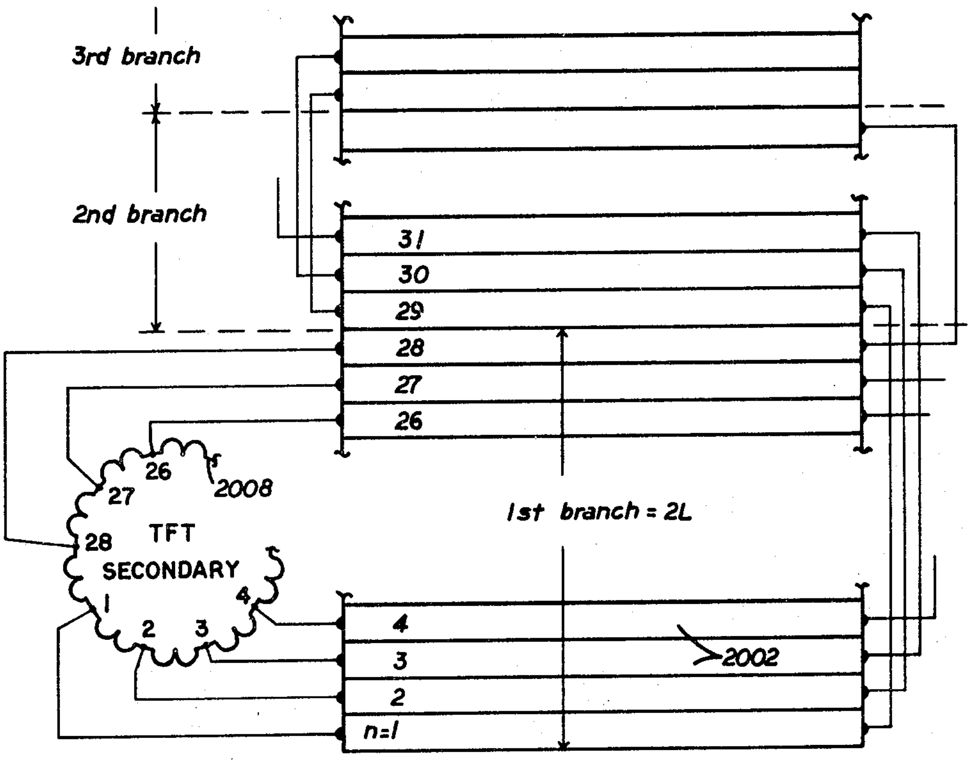

FIG. 15*b* shows how TFT 2008 with a twenty-eight phase mesh connected secondary is wired to conducting strips 2002. The Figure represents the surface as it would appear in a normal view looking down on it. Starting with the first strip, $n=1$ and continuing in order, the 28 secondary phases of TFT 2008 are connected to the individual conductors in sequence. The first group of 28 surface strips energized in this way is called the first branch. The surface can be extended indefinitely by building up additional branches—a second, third, fourth, etc. Elements in a higher order branch are connected to the corresponding elements of the preceding lower order branch, as shown in the Figure. Thus, conductor 29 is connected to conductor 1 and 30 to 2, etc.

A suitable two phase power source for energizing the primaries of TFT 2008 is a sine wave source of fairly high frequency; for example, one with a frequency of 800 cycles/sec. The reason for employing a high-power frequency will be clarified later.

Figure 15C:
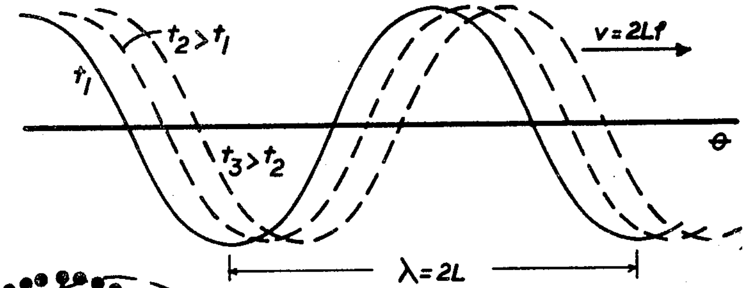

FIG. 15*c* shows the voltages appearing between diametrical secondary terminals of TFT 2008 as a function of angle $\theta$ about the core. The diametrical voltage is the voltage measured between two secondary terminals associated with slots a full pole pitch apart. A pole pitch is defined in FIG. 5*a*. An individual secondary coil and terminal is assumed to be associated with each slot of the transformer core; i.e., each secondary coil may be a type-3 coil as shown in FIG. 5*a*. The voltage pattern shown is produced by the rotating induction field illustrated in FIG. 7*a*. At time $t_1$ excitation of the TFT primary with a sinusoidal current produces a sinusoidal traveling flux distribution and, consequently, the instantaneous spacial variation of diametrical voltage shown. The pattern approximates the variation observed in the diametrical voltage as this voltage is measured between sequential pairs of diametrical terminals at a fixed instant of time, $t_1$. At two progressively later instants of time, $t_2$ and $t_3$, the wave occupies a different position in space; i.e., it has shifted with respect to the diametrical terminals. The diametrical voltage is a traveling sine wave which travels about the diametrical secondary terminals in synchronism with the rotating flux distribution which generates it, giving this voltage the space-time variation of FIG. 15*c*. While the discussion has been in terms of diametrical voltages, the same space-time variation applies to voltages between secondary terminals separated by only a fractional pole pitch. The amplitude of fractional pitch voltage waves are correspondingly smaller.

Figure 15D:
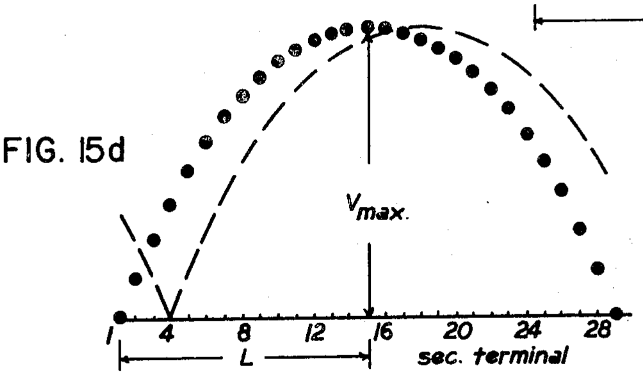

FIG. 15*d* shows the R.M.S. voltage appearing between different secondary terminals, and also because of the TFT surface connections shown in FIG. 15*b*, between various conducting strips in the surface. Solid circles show the R.M.S. voltage measured between terminal No. 1 and each of the other 27 terminals of TFT 2008. At terminal No. 15—the diametrical terminal with respect to terminal No. 1—the R.M.S. voltage has a maximum value, $V_{max}$. On the operating surface, this maximum potential difference appears between strips with separation L, or half the branch length, 2L. For vehicles with a 2 by 4 inch wheel base dimension, L would be made 4 inches long. With respect to terminal No. 4, the R.M.S. voltage variation shown by the dashed curve results, and the maximum now appears with respect to terminal 18. Thus, when excited by a TFT, a cyclic potential gradient exists along the surface between any one strip and all the others, such that the gradient has a maximum value, $V_{max}$, at integral multiplies of L from the reference strip.

In summary, exciting the surface conductors from the secondary of an TFT gives a planar distribution system the following characteristics:

1. The maximum potential difference appearing across any pair of surface conductors is $V_{max}$.

2. $V_{max}$ is available between any pair of conductors separated by L.

3. A smaller voltage is available between any pair of conductors separated by a distance other than L.

4. The smallest nonzero voltage appears between two adjacent strips and is $e$ in magnitude. The voltage appearing between adjacent secondary terminals is $e$.

5. The voltages, $V_{max}$, $e$ and intermediate fractional pitch voltages, all have the same wave shape as the TFT primary power source, but different phase angles.

6. The five preceding characteristics stem from the traveling wave nature of the TFT secondary voltage. On the operating surface, the wavelength $\lambda$ of this traveling wave is $\lambda=2L$, where $2L$ is the physical length of a branch. The velocity, $v$, with which the wave moves across the surface is $v=\lambda f=2Lf$, where $f$ is the power supply frequency.

These quantities are indicated in FIG. 15c.

Voltage Available On Board Vehicle

To obtain the power available from the PPDS, a vehicle operating on it must be equipped with: (a) Current collectors to engage the surface conductors; (b) A means for rendering the on-board voltage substantially independent of vehicle orientation (since the potential gradient on the surface is only in one direction); and (c) A control system for the remote control of vehicle speed and steering.

Current Collectors

Figure 16A:
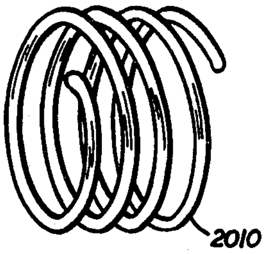

A vehicle makes conductive contact with surface strips 2002 through three spiral wire collectors. Each collector is embedded in the face of one of the three tires equipped for current collection. The fourth tire is not used electrically—it provides mechanical support only. FIG. 16a shows a current collector 2010 before it is mounted on the tire. It consists of a round or rectangular spring tempered wire, preformed into a spiral. The collector is mounted on the tire by setting it into matching spiral grooves in the tire face. A current collector of this type has the following advantages:

1. It introduces no drag, since it is a rolling contact.

2. It provides a conductive contact with the surface while simultaneously permitting a high-traction rubber contact as well.

3. It does not destroy the realism of a vehicle, because in place it is unobtrusive.

4. It is elastic, flexing and deforming with the tire to conform to surface irregularities, thus enhancing the continuity of contact.

Figure 16D:
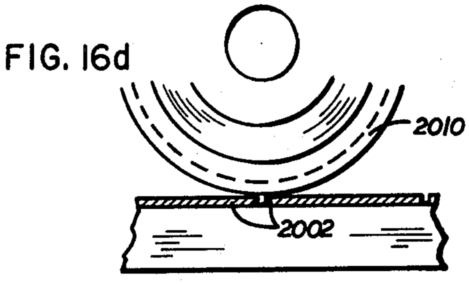
Figure 16B:
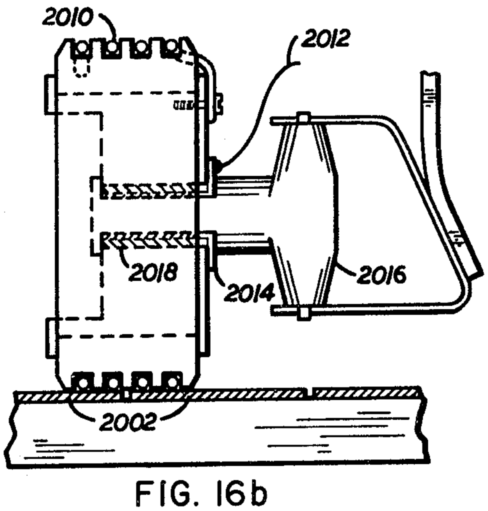
Figure 16C:
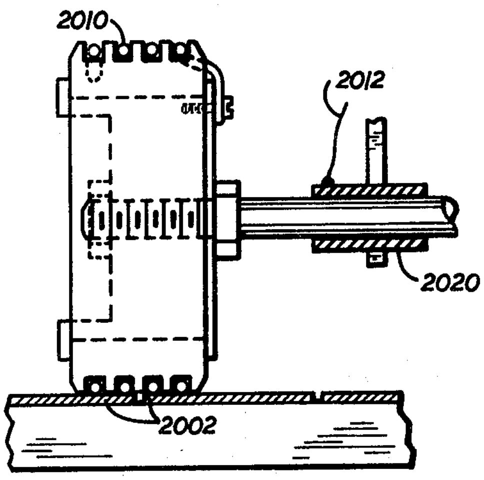

FIG. 16b and c show current collector 2010 mounted in a front and rear tire, respectively. In FIG. 16b, the wheel turns on metal ferrule 2014 pressed onto plastic king pin and axle 2016. Relative motion occurs between carbon graphite journal bearing 2018 mounted in the wheel and ferrule 2014. The graphite journal is both self-lubricating and provides a sliding conducting path from collector 2010 to lead 2012. In FIG. 16c, both wheel and axle turn because traction is applied through the rear axle and wheels. Metal bushing 2020 is stationary and supports the axle. It provides a current path from collector 2010 to on-board lead 2012. These Figures also indicate the current path, going from surface strip 2002 to wire lead 2012 in the vehicle. For both types the current path extends from collector, wheel, axle, axle bearing, to wire lead. The front wheels are independently suspended to assure contact of all four wheels with the surface regardless of surface irregularities. Steering is accomplished by turning the front wheels on king pins 2016, giving an Ackerman steering action.

FIGS. 16b and c show how adjacent conductors 2002 are shorted together when a wheel (collector 2010) straddling two strips, rolls paralleled to the strips. FIG. 16d shows how adjacent conductors 2002 are shorted together by collector 2010 rolling across them (vehicle motion perpendicular to direction of strips). The shorting action is unavoidable if electrical continuity with the surface is to be maintained and is a characteristic feature of the claimed PPDS.

On-board Voltage

The voltage available for use on board a vehicle is the sum of two separate voltages. Each component voltage appears between two of the tire-mounted current collectors 2010 previously described. A vehicle is equipped with three current collectors: Two are carried by the rear tires; and a third, by one of the front tires. With reference to FIG. 17, the two rear tire collectors define a transverse axis 2022 and the voltage between them is the transverse voltage. The one front collector and the rear collector on the same side define a longitudinal axis 2024; the voltage between this pair is the longitudinal voltage. Two mutually perpendicular input axes are required because the potential gradient on the surface has only one direction, and the potential difference between a pair of collectors becomes zero when their axis is perpendicular to the gradient; i.e., when both collectors rest on the same surface strip.

Voltage addition is accomplished with summing transformer 2026, which places the voltage from the transverse axis in series with longitudinal axis voltage. An autotransformer is used for the summing transformer. A minimum quantity of iron is required in this transformer when a high-power frequency is used, and is the reason for using an 800 cycle primary power source.

FIG. 17a shows vehicle 2028 with wheel base length L and width D in contact with surface conductors 2002 through current collectors 2010 for three different, representative positions. Position No. 2 depicts the general case for which the on-board voltage is the sum of the voltage components, $V_l$ and $V_t$, obtained from the longitudinal and transverse axes, respectively. The resultant voltage, $V_{ab}$, is shown across an equivalent load, $R_l$, rather than the actual motor and control circuits. Positions No. 1 and No. 3 illustrate two important special cases. In these positions, only collector contact points with the surface are shown; the summing transformer detail has been omitted. Now consider the components of the on-board voltage for each of the three major positions shown and detailed in FIG. 17b.

Position No. 1—longitudinal axis parallel to surface strips—transverse axis perpendicular to strips. In position No. 1, points $a$ and 4 are in contact with a common strip and the corresponding circuit diagram is shown in FIG. 17b. The transverse axis spans eight secondary coils, and the equivalent load is seen to be supplied entirely by the autotransformer. In position No. 1, the transverse axis spans a maximum number of surface elements and, consequently, the transverse input voltage is a maximum also. The transformer step-up ratio, $k$, is selected to make this maximum transverse voltage equal to $V_{max}$, or $kV_t=V_{max}$. Vehicle length to width ratio, L/D, determines $k$ through the relation $k=1/\sin \pi/2(L/D)$.

Position 3—longitudinal axis perpendicular to surface strips—transverse axis parallel to strips. In position 3, collectors 1 and 4 are in contact with a common strip, and the corresponding circuit diagram is shown in FIG. 17b. The longitudinal axis spans 14 secondary coils, and the equivalent load is supplied directly from them alone. This number of secondary coils corresponds to a diametrical voltage, $V_{max}$, and is the voltage across the equivalent load for position 3. Short circuiting collectors 1 and 4 cause the summing transformer to become saturated, which in effect eliminates it from the circuit entirely, as shown.

Position No. 2—vehicle in a general position on the surface. Both input axes active in supplying the effective load voltage.

The corresponding circuit diagram in FIG. 17*b* shows that the longitudinal axis is supplied from nine secondary coils, and the transverse axis, from six. The voltage, $V_{ab}$, across the effective load is made up of the vector sum, $V_1$ plus $kV_t$. Both voltage components have different phase angles so the resultant is the vector sum and not simply the algebraic sum of the two. The resultant sum is substantially independent of vehicle orientation, for any arbitrary position a vehicle may assume on the surface.

In the upper left-hand portion of FIG. 17*a*, collector 3 is shown bridging two surface strips. The resulting short circuit current, circulated by *e*, the voltage of the one secondary coil of TFT 2008 across these two strips, is limited by the resistance, $2r$. Resistance $2r$ represents the total wire resistance in the leads connecting the shorted secondary coil to the surface strips and the resistance in the collector-surface strip contact. By keeping individual secondary coil voltages small compared to the diametrical voltage, $V_{max}$, the local short circuit produced when a current collector passes across two strips has negligible effect on the on-board voltage $V_{ab}$.

Remote Control System

The traction motor on a toy or model vehicle is a small DC motor requiring several tenths of an ampere of current for operation. It is geared to the rear axle to provide drive for the vehicle. The steering motor is a limited motion DC torque motor with approximately the same current requirements. It is connected to the front wheel king pins by a lever and rod mechanism and steers the vehicle by deflecting king pins 2016 on their pivots. The direction and amount of torque generated by the steering motor is proportional to the sign and magnitude of the direct current passing through it. By independently controlling the direction and magnitude of the DC current passing through the traction and steering motors, a vehicle can be remotely maneuvered on the operating surface.

Figure 16E:
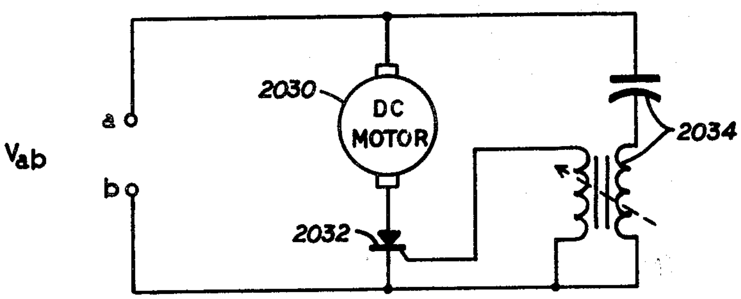
Figure 16F:
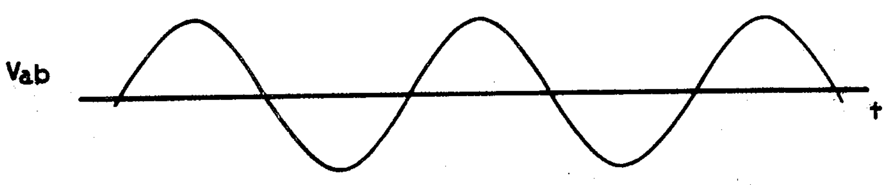

A technique for remotely controlling the current flow through both motors, which results in simple miniature circuits with relatively few components, uses solid state controlled rectifiers. Controlled rectifiers are triggered into conduction by carrier current pulses also transmitted to a vehicle in the PPDS conductors. FIG. 16*e* is a simplified schematic diagram of a receiver circuit capable of controlling the current flow through motor 2030 in one direction. The circuit is energized by connecting points *a* and *b* to the corresponding two points shown in FIG. 17 in place of the equivalent load resistor, $R_1$. FIG. 16*f* shows the sine wave on-board $V_{ab}$, which appears between these two points for any position a vehicle may assume on the surface. Conduction of controlled rectifier 2032 is initiated by a carrier current trigger pulse. By varying the phase angle at which the trigger pulse occurs relative to the alternating voltage $V_{ab}$, the conduction angle of rectifier 2032 is controlled and, consequently, the flow of rectified current through motor 2030. The carrier pulse is detected by series tuned circuit 2034 in the receiver, and from the transformer secondary, applied to the gating terminals of controlled rectifier 2032. Provision for controlling current flow through the motor in the opposite direction, to reverse it, and for including a second control channel for the second motor can be made by conventional means and are known to those skilled in the art.

What is claimed is:

1. A tape recorder head, comprising magnetically unsaturated elongated core means of substantially uniform permeability having coil slots therein and having a narrow airgap therein to accommodate the passage of a magnetic tape, coil means including coil sides in said slots and including exciting means to provide in said airgap, a narrow traveling m.m.f. beam substantially perpendicular to the plane of said coil slots and being directed across the narrow dimension of said airgap acting on only one point on a transverse tape track at a given instant, said coil means and exciting means including circuit means to provide interacting magnetic fields to move said m.m.f. beam along the air gap.

2. A tape recorder head comprising first elongated core means having coil slots therein, second core means adjacent said first core means covering said slots and defining a narrow airgap to allow passage of a magnetic tape therebetween, first and second stator coils mounted in said slots in respective orthogonal relationship, main m.m.f. beam producing means including signal source means applying first and second orthogonally related main sawtooth signals to said first and second stator primary coils respectively, stator traveling field transformer means including primary and first and second auxiliary coils inductively coupled to said respective first and second stator coils, said stator coils, and transformer primary and auxiliary coils having a substantially sinusoidal distribution, signal means providing first and second sawtooth signals to respective transformer primary coils.

3. The tape recorder head of claim 2 including a playback winding positioned in said slots.

4. The tape recorder head of claim 3 in which the auxiliary coils provide phase modulating signals, the main m.m.f. distributions from said first and second stator coils being subtractive resulting in minimal m.m.f. in the absence of said phase modulating signals, said phase modulating signals being equal and oppositely applied to respective auxiliary coils to provide an alternating m.m.f. beam.

5. A traveling field tape recorder head for recording on tape comprising a slotted magnetic core, said core being magnetically unsaturated and of substantially uniform permeability, two phase sinusoidally distributed stator windings in said slots, a core piece bridging said slots and defining a narrow, elongated airgap constituting tape slot, exciting means coupled to said stator windings to produce a slender alternating traveling wave m.m.f. beam into said airgap passing along said slots and perpendicular to the plane of said tape, acting on only one point on a transverse tape track at a given instant, said exciting means and said sinusoidally distributed stator windings providing traveling wave action as a result of interacting magnetic fields.

6. The recorder head of claim 5 in which said exciting means include sawtooth exciting current source means.

7. A tape-recording system comprising tape-recording head means including means to provide a narrow traveling m.m.f. beam perpendicular to the plane of a magnetic tape, said head including first and second orthogonally related stator coils disposed to provide a sinusoidally varying current distribution, a playback coil, first traveling field transformer means including first and second orthogonally related primary coils, and secondary coil means, said secondary coil means being coupled to said first stator coil, second traveling field transformer means including first and second orthogonally related primary coils, and secondary coil means, said secondary coil means being coupled to said second stator coil, sawtooth generating means exciting the first and second primaries of the first and second traveling field transformer means with 90° phase displaced sawtooth signals respectively, first auxiliary transformer means comprising first and second orthogonally related primary coils magnetically coupled respectively to the first and second primary coils of said first traveling field transformer means, second auxiliary transformer means comprising first and second orthogonally related primary coils magnetically coupled respectively to the first and second primary coils of the said second traveling field transformer means, modulating means to excite the said primary coils of said first and second auxiliary transformer means respectively with signals at $r+s$ and $r-s$ frequencies respectively, where $r$ is a carrier frequency and $s$ is the frequency of the sawtooth signals, and information signal means to modulate said $r+s$ and $r-s$ signals respectively with desired input signals, and playback circuit means coupled to said playback coil to derive signals from said playback coil.

8. The system of claim 7, where $r$ is high relative to $s$.

9. The tape-recording system of claim 7, in which said playback circuit means and said modulating means are in a control loop, including a frequency demodulator and means to compare the signal derived from the playback circuit with the input signal recorded in said tape.

10. A tape-recording system comprising, stationary outer core means, stationary inner core means, one of said core means having an airgap slot through which magnetic tape may pass, said core being magnetically unsaturated and of substantially uniform permeability, means for moving said tape in a first direction through said core means, means to establish a magnetic field of narrow width from the inner core means to the outer core means in a direction perpendicular to the tape surface, means to modulate said magnetic field with information signals, means to move said magnetic field in a direction transverse to the direction of tape movement, said magnetic field acting upon only one point on a transverse tape track at a given instant.

11. A magnetic recording head comprising a magnetic core structure, including an inner and outer core and an airgap therebetween, said core structure being magnetically unsaturated and of substantially uniform permeability, part of said core structure defining said gap further defining an elongated aperture through which a magnetizable medium passes; two stator windings mounted in said core; each winding producing recurrent m.m.f. distributions across the airgap, the distributions moving along the gap as traveling waves caused by the interaction of magnetic fields, produced by the stator windings, the resultant m.m.f. of the two waves magnetizes the medium passing through the aperture, means providing quadrature current flowing in the two phases of said stator windings, said stator windings being mutually orthogonal and sinusoidally distributed in space along the airgap, whereby said traveling waves are provided.

12. The recorder of claim 11 further comprising first and second traveling field transformer means coupled to respective stator windings.

13. The head of claim 11, said quadrature currents in the two stator windings being substantially sawtooth functions of time, two narrow traveling m.m.f. beams being formed across the airgap from the instantaneous difference between the two sawtooth functions.

14. The head of claim 13, in which the m.m.f. beams alternate in polarity at approximately a sinusoidal rate in response to phase modulation impressed on the constituent sawtooth functions, means to produce the said phase modulations on each sawtooth function, whereby a beam can write information into a magnetizable medium by alternating at a modulated frequency as it travels along the aperture thereby leaving FM remnant tracks in the tape.

15. The recording head of claim 13 in which the stator windings have a high-resonant frequency, whereby for a given beam velocity, the bandwidth of the recording system is determined by the spacial width of the m.m.f. beam in the direction of beam velocity fixed by the retrace time of the sawtooth currents exciting the stator windings.

16. The recording head of claim 11 including an additional two-phase sinusoidally distributed winding mounted in the core structure to span the aperture portion of the airgap to provide a playback winding thereby permitting information recorded in the tape to be recovered as an electrical signal.

17. The recording head of claim 16 in further combination, an external feedback loop coupled to said playback winding, whereby traveling beams of reduced intensity can be used to track and read information previously recorded in the tape.

* * * * *